(12) United States Patent
Nakajima et al.

(10) Patent No.: US 7,499,440 B2
(45) Date of Patent: Mar. 3, 2009

(54) COMMUNICATION SYSTEM, NETWORK ROUTER AND NETWORK CONNECTION METHOD

(75) Inventors: Kazuya Nakajima, Isesaki (JP); Masaki Yoshizawa, Honjo (JP); Masaru Tabata, Gunma (JP); Wataru Iwazaki, Gunma (JP)

(73) Assignee: Sanden Corporation, Gunma (JP)

( * ) Notice: Subject to any disclaimer, the term of this patent is extended or adjusted under 35 U.S.C. 154(b) by 386 days.

(21) Appl. No.: 11/387,058

(22) Filed: Mar. 23, 2006

(65) Prior Publication Data

US 2006/0227738 A1 Oct. 12, 2006

(30) Foreign Application Priority Data

Mar. 25, 2005 (JP) ............................. 2005-087619
Mar. 14, 2006 (JP) ............................. 2006-069177

(51) Int. Cl.
*H04Q 7/00* (2006.01)
*H04J 3/24* (2006.01)
*H04L 12/66* (2006.01)
*H04L 12/28* (2006.01)
*H04L 12/54* (2006.01)

(52) U.S. Cl. ................ 370/338; 370/328; 370/349; 370/352; 370/402

(58) Field of Classification Search ................ 370/310, 370/312–313, 328, 338, 349, 392–393, 389–390, 370/395.52, 395.54, 400–401, 901–902, 370/908, 911–913, 352, 395.5, 402, 429, 370/465–467, 469, 474–475; 455/41.2, 403, 455/445, 524–525, 550.1, 552.1, 556.1–556.2, 455/557–558, 561; 709/203, 216, 219, 225, 709/227–229

See application file for complete search history.

(56) References Cited

U.S. PATENT DOCUMENTS

| 6,163,532 | A | * | 12/2000 | Taguchi et al. | ............... 370/338 |
|---|---|---|---|---|---|
| 2001/0054101 | A1 | | 12/2001 | Wilson | |
| 2003/0105841 | A1 | * | 6/2003 | Miyake et al. | ............... 709/220 |
| 2003/0172142 | A1 | * | 9/2003 | Su | ............... 709/223 |
| 2004/0105415 | A1 | * | 6/2004 | Fujiwara et al. | ............. 370/338 |
| 2005/0025182 | A1 | * | 2/2005 | Nazari | ........................ 370/469 |
| 2005/0152287 | A1 | * | 7/2005 | Yokomitsu et al. | .......... 370/255 |
| 2006/0077957 | A1 | * | 4/2006 | Reddy et al. | ................. 370/352 |

FOREIGN PATENT DOCUMENTS

| JP | 2003-051056 | 2/2003 |
|---|---|---|
| WO | 01/97485 | 12/2001 |
| WO | 03/049384 | 6/2003 |

OTHER PUBLICATIONS

European Search Report dated Jan. 24, 2008.

* cited by examiner

*Primary Examiner*—Meless N Zewdu
(74) *Attorney, Agent, or Firm*—Banner & Witcoff, Ltd.

(57) ABSTRACT

A connection adapter is interposed between high-level equipment and a communication module. The connection adapter and a router perform a circuit control and an address conversion processing so that the high-level equipment and a management computer set for the network connection service giving a fixed IP address can use the network connection service giving a dynamic IP address.

12 Claims, 28 Drawing Sheets

Fig. 6

SETTING DATA FOR RADIO PACKET COMMUNICATION NETWORK 40

| CALLING DESTINATION | ATD9999 |
|---|---|
| FIXED IP ADDRESS OF HIGH-LEVEL EQUIPMENT | 192.168.0.1 |
| PAP AUTHENTICATION DATA | USER NAME :user@example.com<br>PASSWORD :password |
| IP ADDRESS OF CONNECTION DESTINATION ROUTER | 172.16.0.14 |

65a HIGH-LEVEL EQUIPMENT INFORMATION TABLE

| FIXED TERMINAL IP ADDRESS | TELEPHONE NUMBER |
|---|---|
| 192.168.0.1 | 080XXYY |

Fig. 9

| COMMUNICATION ID | FIXED TERMINAL IP ADDRESS | DYNAMIC TERMINAL IP ADDRESS | LAN SIDE IP ADDRESS | ROUTER IP ADDRESS |
|---|---|---|---|---|
| 1 | 192.168.0.1 | 172.16.0.X | 192.168.9.10 | 172.16.0.14 |

65b ADDRESS CONVERSION TABLE

65a HIGH-LEVEL EQUIPMENT INFORMATION TABLE

| FIXED TERMINAL IP ADDRESS | TELEPHONE NUMBER |
|---|---|
| 192.168.0.5 | 080XXYY |

Fig. 20

VIEW FOR EXPLAINING ADDRESS CONVERSION OF IP PACKET HEADER FROM HIGH-LEVEL EQUIPMENT TO MANAGEMENT COMPUTER

FIRST HIGH-LEVEL EQUIPMENT

| Dest. | Src. |
|---|---|
| IP ADDRESS OF MANAGEMENT COMPUTER (192.168.9.10) | IP ADDRESS OF 1st HIGH-LEVEL EQUIPMENT (192.168.0.1) |

CONVERSION AT CONNECTION ADAPTER

DYNAMICALLY GIVEN AT IPCP

| Dest. | Src. |
|---|---|
| WAN SIDE IP ADDRESS OF ROUTER (172.16.0.14) | IP ADDRESS OF CONNECTION ADAPTER (172.16.0.X) |

CONVERSION AT ROUTER

OBTAIN FROM CONNECTION ADAPTER

OBTAIN FROM TELEPHONE NUMBER

| Dest. | Src. |
|---|---|
| IP ADDRESS OF MANAGEMENT COMPUTER (192.168.9.10) | IP ADDRESS OF 2nd HIGH-LEVEL EQUIPMENT (192.168.0.5) |

MANAGEMENT COMPUTER

Fig. 22

| 65a HIGH-LEVEL EQUIPMENT INFORMATION TABLE | | |
|---|---|---|
| FIXED TERMINAL IP ADDRESS | TELEPHONE NUMBER | TERMINAL IP ADDRESS OF CONNECTION DESTINATION |
| 192.168.0.1 | 080XXYY | 192.168.9.11 |

*Fig. 25*

43a ADDRESS CORRESPONDENCE TABLE

| TERMINAL IP ADDRESS | TELEPHONE NUMBER |
|---|---|
| 172.16.0.1 | 080XXYY |

Fig. 27

VIEW FOR EXPLAINING ADDRESS CONVERSION OF IP PACKET HEADER FROM HIGH-LEVEL EQUIPMENT TO MANAGEMENT COMPUTER

HIGH-LEVEL EQUIPMENT

| Dest. | Src. |
|---|---|
| IP ADDRESS OF MANAGEMENT COMPUTER (192.168.9.10) | IP ADDRESS OF HIGH-LEVEL EQUIPMENT (192.168.0.1) |

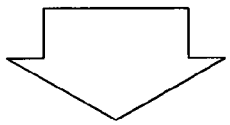
CONVERSION AT CONNECTION ADAPTER

DYNAMICALLY GIVEN AT IPCP

| Dest. | Src. |
|---|---|
| IP ADDRESS OF MANAGEMENT COMPUTER (192.168.9.10) | IP ADDRESS OF CONNECTION ADAPTER (172.16.0.X) |

TO MANAGEMENT COMPUTER THROUGH ROUTER

COMMUNICATION SYSTEM, NETWORK ROUTER AND NETWORK CONNECTION METHOD

BACKGROUND OF THE INVENTION

1. Field of the Invention

The present invention relates to the field of telemetering used in collecting of sales information of an automatic vending machine and the like or the field of telematics used in delivering traffic information.

2. Description of the Related Art

In recent years, telemetering or telematics used in collecting or delivering information through a radio packet communication network has been in widespread use. Originally, telemetering was a general term given to the mechanism to read a measured value of a measuring instrument by using a communication circuit. However, in recent years, the term is generally used not only for reading data, but also for monitoring of operation or remote control of a device. Examples of "telemetering" include a sales management system for an automatic vending machine, a consumption management system of gas, water, or the like, and a management system in unmanned parking lot, and the like. As an example of the sales management system of automatic vending machine, refer to Japanese Patent Publication 2003-51056. The term "telematics" means real time provision of information service by combining a communication system with mobile objects such as a vehicle. Examples of "telematics" include an on-vehicle information system for providing in real time traffic information or navigation information to a terminal mounted in a vehicle.

In such field, a communication device for connecting to the radio packet communication and high-level equipment using the communication device are required in a remote area. The high-level equipment corresponds to DTE (Data Terminal Equipment), and the communication device corresponds to DCE (Data Circuit-terminating Device). For example, in a sales management system for an automatic vending machine, the control equipment performing sales control and temperature control in the machine corresponds to the high-level equipment.

The radio packet communication network is constructed by using a network connection service for connecting a LAN and a radio communication terminal provided by carriers (communication common carriers). In this network connection service, a network router is provided in the LAN of a user of the service, and through a radio packet communication network constructed by the service, a radio communication terminal can be connected to the LAN. The radio communication terminal is usually connected to the LAN by using PPP (Point-to-Point Protocol) through the radio packet communication network only when necessary. Here, an address space of the radio packet communication is defined in advance by the carriers. An IP address of the radio packet communication network side (WAN side) is allotted with a fixed IP address included in the address space. With respect to the IP address of the radio communication terminal, a fixed IP address included in the address space is allotted or one piece of the IP addresses included in the address space is dynamically allotted when connected with the radio packet communication network.

Now, the standard, service configuration and the like of radio packet communication networks vary according to carriers, and thus, the standard and operation of the communication device also vary according to the carriers. For example, depending on the network connection services provided by the carriers, an allotment method, connection method, authentication method and the like of the IP address given to a connection terminal vary. Consequently, to design high-level equipment, carriers and communication device to be used are selected in advance, and an operation corresponding to the communication device is performed.

In recent years, there have been requests to change the carrier after having constructed such system. The reasons for this include, for example, "the condition of radio wave provided by the carrier in the location of placement of the high-level equipment is unstable or inappropriate". Particularly, there have been requests to change from the network connection service allotting a fixed IP address to a connection terminal to the network connection service dynamically giving an IP address.

However, there has been a problem that the network connection service dynamically giving an IP address destabilizes the IP address of the connection terminal and this prevents the LAN side device from starting a communication with the connection terminal. In addition, the change of the carrier or the service necessitates the change of the communication device, and consequently the high-level equipment must be also changed and modified accordingly. The high-level equipment is placed, due to the properties of such system, in remote areas in a dispersed manner, and when the high-level equipment is already in the market, it takes a vast amount of works for the change and modification of the high-level equipment. Not only the change of the carrier, but also the change of model of the communication device may cause the same problem even if the same carrier is used. This problem may take place also when a change of the carrier or a model change is made in the future. Hence, to construct a system, it is essential to cautiously select a service, a carrier, and a model. Moreover, when a system using a plurality of carriers, services, and communication device is constructed, high-level equipment compatible with carrier or communication service must be prepared. This creates a problem that a costly system is constructed.

BRIEF SUMMARY OF THE INVENTION

An object of the present invention is to provide a communication system capable of using various network connection services.

To achieve the above object, the present application proposes the following communication system. This communication system uses a network connection service connecting a LAN and a radio communication terminal through a radio packet communication network and dynamically giving an IP address within a first address space to the radio communication terminal. At a boundary point between a radio packet communication network and the LAN, a network router is provided. The radio communication terminal comprises a communication device connecting to the radio packet communication network, high-level equipment performing a communication by using the communication device; and a connection adapter interposed between the communication device and the high-level equipment and performing a relay of communications. The high-level equipment is allotted in advance with an IP address for the network connection service fixedly giving an IP address within a second address space as its own IP address. Moreover, an IP address within a third address space is fixedly specified as an IP address of the terminal of the LAN side. The connection adapter comprises an IP address within the first address space stored in the header of the IP packet to be transmitted and received, and communication control unit for mutually converting the IP addresses within the second or the third address space.

According to the present invention, in the system constructed for the IP addresses in the second and third IP address spaces, without adding modification or change to the radio communication terminal, the LAN and the like, it is possible to use the network connection service performing operation by the IP address in the first address space as the radio packet communication network. Consequently, a flexible system design can be made.

The high-level equipment corresponds to DTE (Data Terminal Equipment), and the communication device corresponds to DCE (Data Circuit-termination Equipment). The "IP address is dynamically given" means the distribution of the IP addresses to the radio communication terminal by the communication network when the radio communication terminal connects to the radio packet communication network. Here, the distribution of the IP addresses falls under a case where one of the IP addresses included in a predetermined range is fixedly distributed or a case where the IP address corresponding to the radio communication terminal is fixedly distributed. Which case is applied depends on the service configuration in the radio packet communication network.

The network router to be used in the communication system according to the present invention will be proposed as follows. When this network router receives a communication start request from the LAN side terminal with a fixed terminal IP address allotted in advance to the radio communication terminal as an address, the connection control means sends a notice to the radio communication terminal to the effect that it be connected to the network router. This notice is sent by using a messaging service provided by the network connection service. This notice includes management information for identifying to which communication the connected radio communication terminal relates.

The radio communication terminal, upon receipt of the notice, connects to the network router by using the network connection service, and transmits the control information to the network router. Here, at the point of time when the radio communication terminal is connected to the radio packet communication network, the radio communication terminal is given a dynamic terminal IP address. This dynamic terminal IP address can be obtained by the connection control means of the network router by referring to the sender IP address of the IP packet storing management information.

The connection control means of the network router, by comparing the management information received from the radio communication terminal with the management information stored in the storage means, can specify from which radio communication terminal the management information is received.

Subsequently, the communication control means of the network router mutually converts the IP address of the LAN side terminal stored in the header of the IP packet according to the above communication and the IP address of the radio packet communication network side of the network router, and mutually converts the fixed terminal IP address and the dynamic terminal IP address. In this manner, between the LAN side terminal and the radio communication terminal, a connection at an IP layer level is established, and thus, the communication at a high-level layer (TCP, UDP, and the like) higher than the IP layer can be made possible.

Further, in the network connection service giving the dynamic IP address to the radio communication terminal, when the communication is started to the LAN side from the radio communication terminal, it is not possible to specify from which radio communication terminal the communication is even in the LAN side terminal.

Hence, in the network router according to the present invention, when a communication start request is received from the radio communication terminal by using the network connection service, the connection control means obtains the fixed terminal IP address of the radio communication terminal corresponding to a telephone number included in the communication start request from the storage means, and obtains a dynamic terminal IP address dynamically given to the radio communication terminal from the communication start request, and stores the IP address of the LAN side terminal which is the destination of the fixed terminal IP address and the communication, and the dynamic IP address in the storage means. Then, the address converting means, based on each address information stored in the storage means, mutually converts the IP address of the LAN side terminal stored in the header of the IP packet according to the above communication and the IP address of the radio packet communication network side of the network router therebetween, and mutually converts the fixed terminal IP address and the dynamic terminal IP address therebetween.

By such processing, the sender IP address of the packet received by the LAN side terminal becomes not the dynamic terminal address but the fixed terminal IP address, and thus, the LAN side terminal can specify the radio communication terminal which becomes a communication partner. This fixed terminal IP address converts an IP address corresponding to the telephone number of the radio communication terminal in the network router, and has no correlation with the IP address actually set in the radio communication terminal. Consequently, by storing the fixed IP address different from the IP address actually set in the radio communication terminal in the storage means as the fixed terminal IP address, the communication partner can be disguised for the LAN side terminal.

Other objects, configurations, and advantages of the present invention will be made apparent in the following detailed descriptions.

BRIEF DESCRIPTION OF THE SEVERAL VIEWS OF THE DRAWING

FIG. 2 is a network view assumed by high-level equipment and the like;

FIG. 6 is a view for explaining an example of setting information in the connection adapter;

FIG. 9 is a view for explaining an example of an address conversion table;

FIG. 20 is a view for explaining an address conversion processing in case of disguising of high-level equipment;

FIG. 22 is a view for explaining an example of a high-level equipment information table;

FIG. 25 is a view for explaining an example of an address management table;

FIG. 27 is a view for explaining an address conversion processing;

DETAILED DESCRIPTION OF THE INVENTION

First Embodiment

Figure 1:
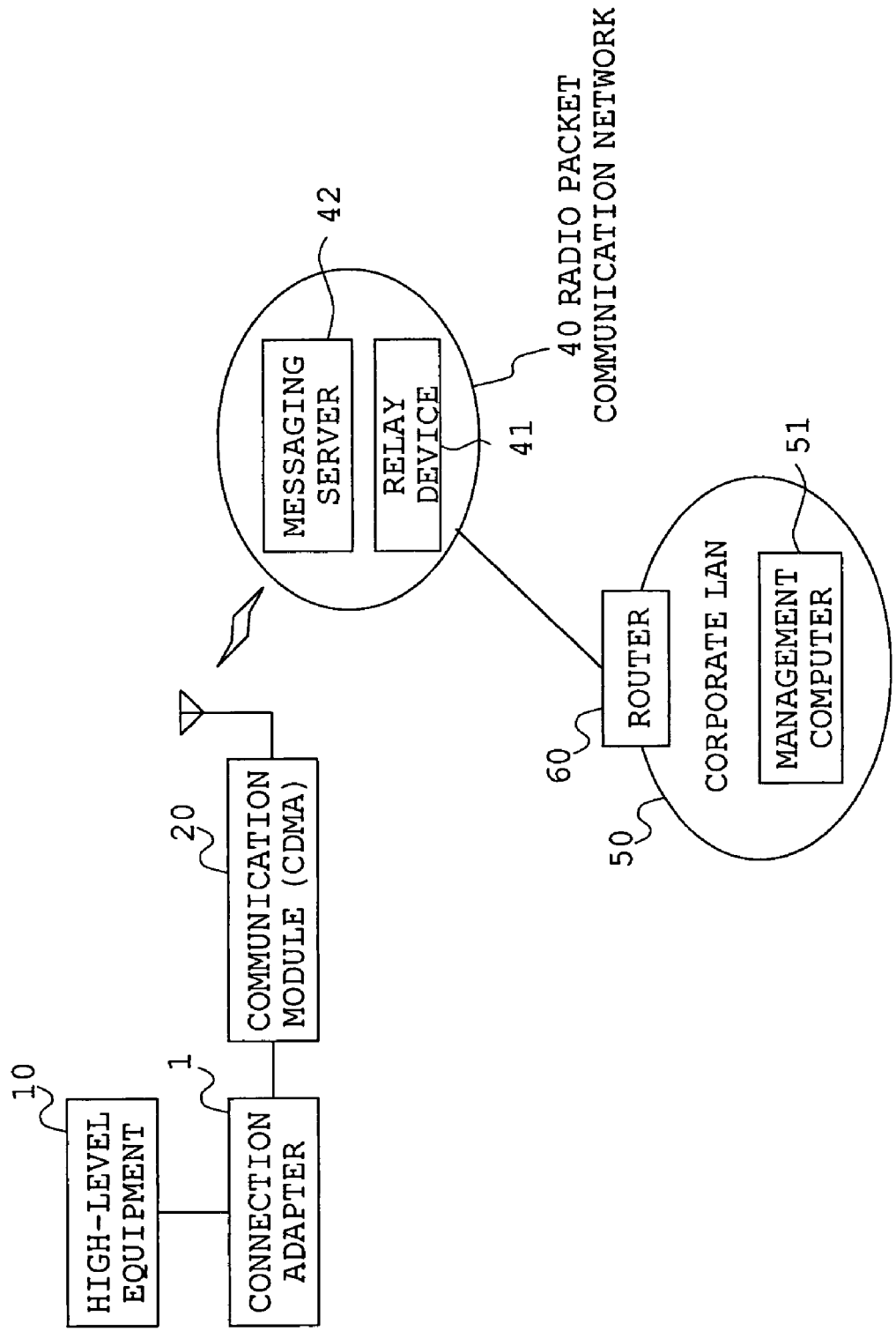
FIG. 1 is a schematic diagram of a communication system according to a first embodiment.

A communication system according to a first embodiment of the present invention will be described with reference to the drawings. FIG. 1 is a block diagram of a telemetering system using the communication system according to the present invention.

An object of the present system, as shown in FIG. 1, for example, is to provide a network environment connecting high-level equipment 10 such as a control equipment of an automatic vending machine and the like and a corporate LAN 50 through a radio packet communication network 40. Specifically, a main object of the present invention is to make a network connection service usable, in which the radio packet communication network 40 gives a dynamic IP address to a connection terminal without performing any modification on the high-level equipment 10 specified for the network connection service fixedly giving an IP address and the terminal (management computer 51 and the like of the automatic vending machine in the case of an example of FIG. 1) of a corporate LAN 50. To achieve this object, it is also an object of the present invention to make it possible to start a communication from the terminal within the corporate LAN 50 to the high-level equipment 10 and to make it also possible to specify the high-level equipment 10 in the communication from the high-level equipment 10. The present communication system will be described below in detail.

The high-level equipment 10 corresponds to DTE (Data Terminal Equipment). This high-level equipment 10 is designed to correspond to a specific carrier and the network connection service provided by that carrier. Specifically, the high-level equipment 10 is designed to assume use of the network connection service giving a fixed IP address to the connection terminal, and connect a communication module corresponding to the service, and correspond to a connection protocol according to the service, an authentic protocol and the like.

The network connection service assumed by the high-level equipment 10 will be described. In this network connection service, the communication module is allotted in advance with a telephone number by a carrier. The radio packet communication network under the provision of this network connection service is provided with a relay device for performing a circuit control, a packet relay and the like. The relay device is allotted with a telephone number corresponding to the corporate LAN which is a connection destination network. The terminal connected with the communication module, when calling the telephone number of the relay device within the radio packet communication network, is connected to a predetermined network such as the corporate LAN and the like. The connection to the relay device is permitted only from the communication module allotted in advance with the telephone number.

Figure 2:
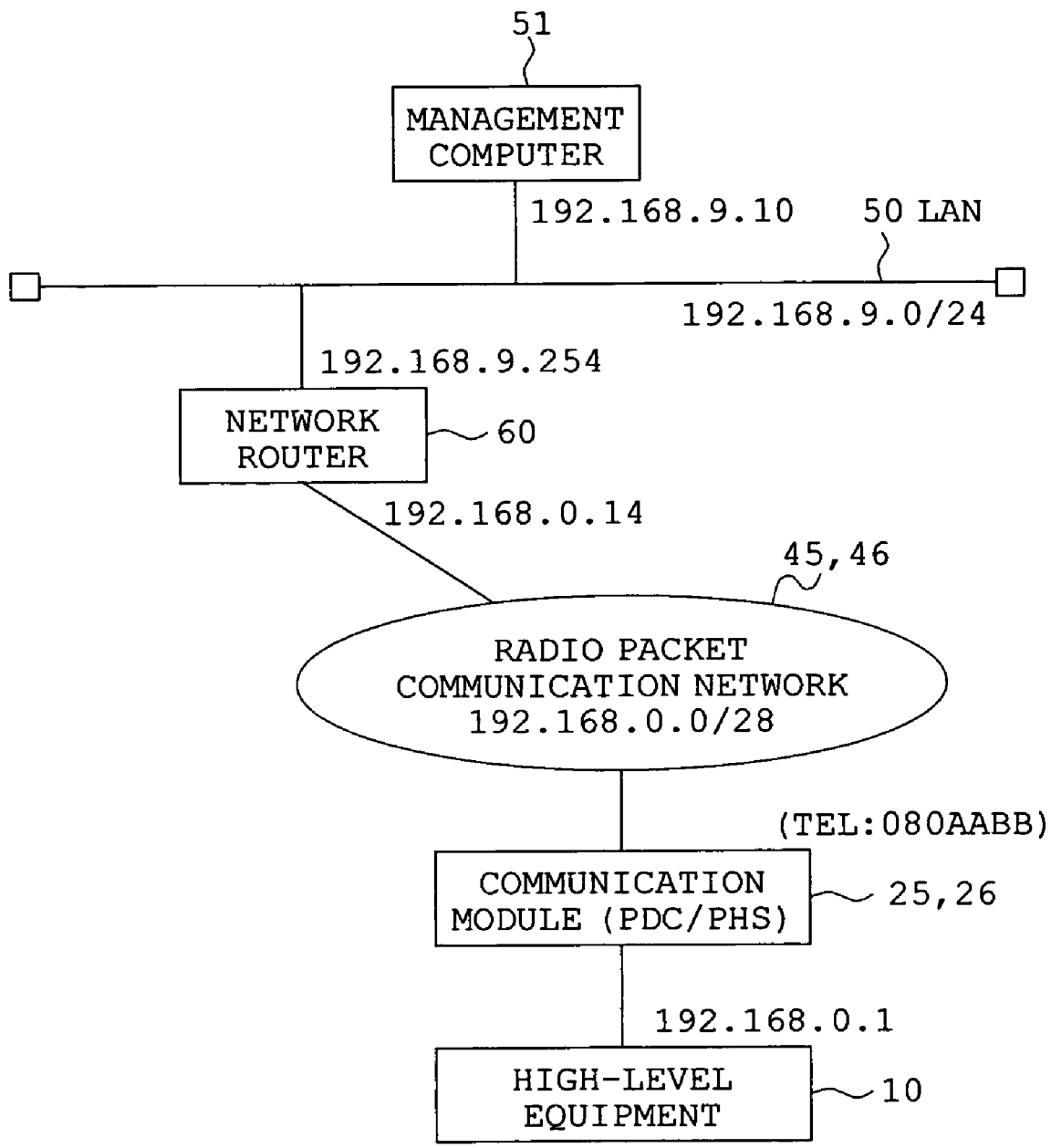

In FIG. 2 is shown an example of the network diagram when using the network connection service assumed by the high-level equipment 10. As shown in FIG. 2, the high-level equipment 10 is connected to radio packet communication networks 45 and 46 constructed by the network connection service by using communication modules 25 and 26. In the present embodiment, the radio packet communication network 45 and the communication module 25 are assumed as conforming to PDC (Personal Digital Cellular) regulation, and the radio packet communication network 46 and the communication module 26 are assumed as confirming to a PHS (Personal Handy-phone System) regulation. In this service, the WAN side interface of the network router 60 and the communication module 25 are fixedly allotted with the IP addresses belonging to the network of 192.168.0.0/28. The high-level equipment 10 is connected to the LAN 50 by a terminal type network connection service. Consequently, the IP addresses allotted to the communication modules 25 and 26 are synonymous with the IP addresses allotted to the high-level equipment 10. The IP address of each device is assumed to be fixedly allotted so that the corporate LAN 50 may belong to the network 192.168.9.0/24. The network router 60, upon receipt of the packet addressed to the IP address within 19.168.0.0/28 from the LAN 50, relays that packet to the radio packet communication networks 45 and 46. On the other hand, the network router 60, upon receipt of the packet addressed to the IP address within 192.168.9.0/24 from the radio packet communication networks 45 and 46, relays that packet to the LAN 50. By such configuration, the management computer 51 can start a communication for the fixed IP address of the high-level equipment 10, and with respect to the communication from the high-level equipment 10 also, it is possible to specify the high-level equipment 10 by referring to the sender IP address of the communication.

The present invention assumes using such high-level equipment 10 and the management computer 51 as they are, and can construct a network system even in the radio packet communication network 40 under the provision of the network connection service giving a dynamic IP.

Next, the network connection service giving a dynamic IP address used in the present embodiment will be described. In this network connection service, a communication module 20 is allotted in advance with a telephone number by a carrier. The radio packet communication network 40, as shown in FIG. 1, is provided with a relay device 41 for performing a circuit control, a packet relay, and the like. The terminal connected to the communication module 20 is connected to the radio packet communication network 40 by designating and calling a predetermined specific number. Then, the terminal, by performing an authentication processing with the relay device 41 by using PAP (Password Authentication Protocol), can be connected to the corporate LAN 50 which is a connection destination network. In the PAP authentication, by including the information specifying the connection destination in the user name, the connection destination network is specified. In this network connection service, an IP address group of a predetermined range is allotted to the radio packet communication network 40 from the carrier, and the communication module 20 is dynamically allotted with the IP address included in the IP address group by IPCP (Internet Protocol Control Protocol). The IP address allotted to the communication model 20 is uncertain, and the same IP address as the previous connection time may be allotted or a different IP address may be allotted.

In this network connection service, a messaging service is assumed to be provided to the user. This messaging service is not the network connection service using TCP/IP, but is implemented by an independent protocol using the radio communication network. In this messaging service, the telephone number of the communication module 20 is designated for a predetermined messaging server 42 provided for other networks such as the radio packet communication network 40 or an internet, and the like, so that a relatively short message can be transmitted. For a message transmission request to the messaging server 42, HTTP is used.

Figure 3:
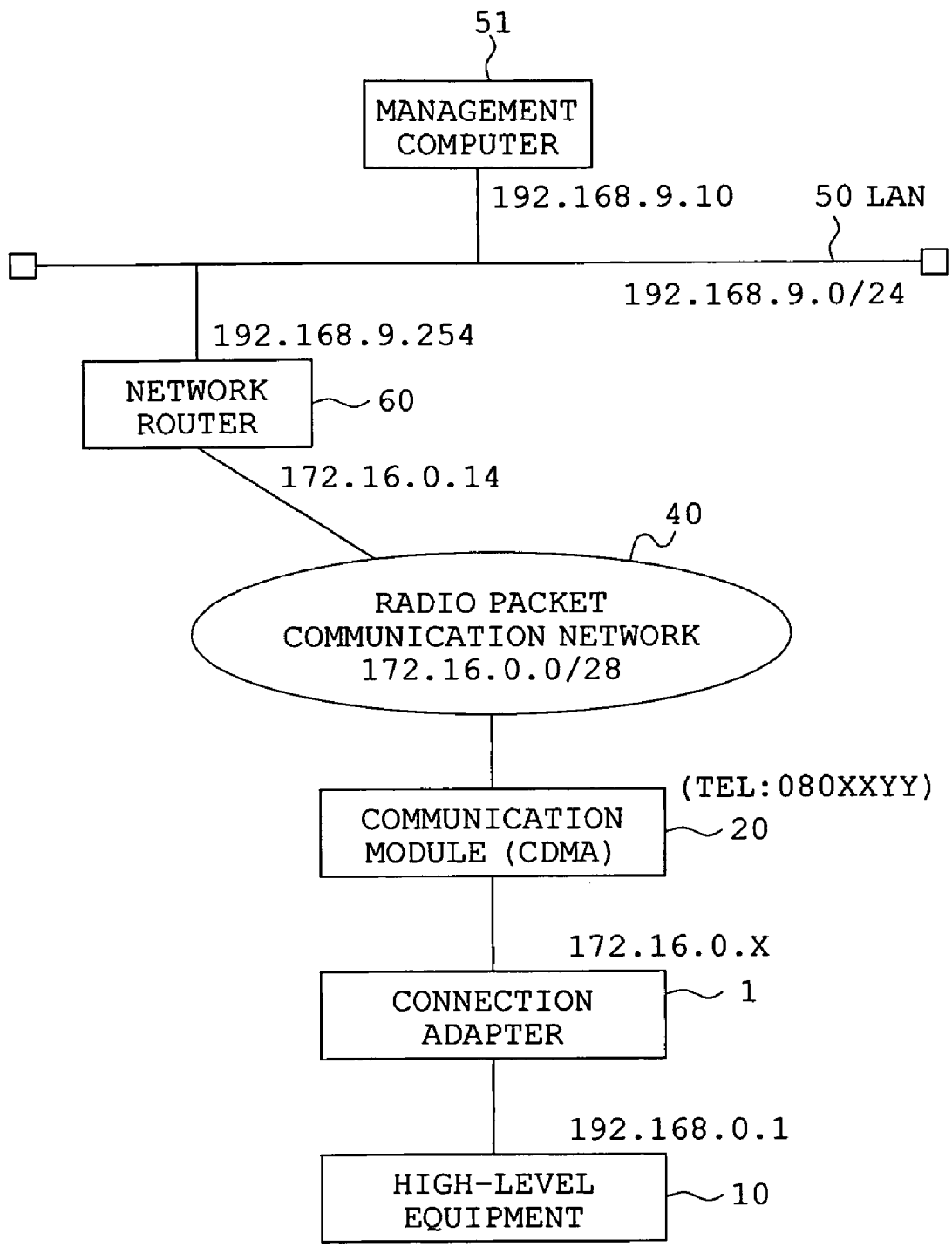
FIG. 3 is a network view of a system according to the first embodiment.

Next, a network diagram of the system according to the present embodiment will be described with reference to FIG. 3. FIG. 3 is a network diagram of the present system. As shown in FIG. 3, in this system, the corporate LAN 50 is given a fixed IP address belonging to 192.168.9.0/24 similarly to the network described referring to FIG. 2, and the high-level equipment 10 is given a fixed IP address belonging to 192.168.0.0/28. The radio packet communication network 40 is given an address group of 172.16.0.0/28, and the WAN side of the network router (hereinafter simply referred to as [router]) 60, which corresponds to a boundary point with the radio packet communication network 40 and the corporate LAN 50, is allotted with a fixed IP address 172.16.0.14. Further, the communication module 20, when connected to the radio packet communication network 40, is dynamically allotted with an address within 172.16.0.0/28 (which is inscribed as 172.16.0.0. X for convenience' sake in the diagram). A connection adapter 1 is connected to the LAN 50 by terminal type network connection service. Consequently, the IP address of the connection adapter 1 is an IP address dynamically allotted to the communication module 20. In the present invention, in such network environment, a communication is allowed to be started for the high-level equipment 10 from the management computer 51 within the corporate LAN 50, and in case a communication is started from the high-level equipment 10 to the management computer 51, it is possible to specify the high-level equipment 10.

Next, the connection adapter 1 will be described in detail. This connection adapter 1 is a device connecting a plurality of types of high-level equipment 10 corresponding to Data Terminal Equipment, and the communication device is equipment connecting a plurality of types of communication modules 20, 25, and 26 corresponding to Data Circuit-terminating Equipment. The connection adapter 1 according to the present embodiment corresponds to the communication module 20 of CDMA (Code Division Multiple Access) standard, the communication module 25 of PDC standard, and the communication module 26 of PHS standard. Each of the communication modules 20, 25, and 26 is communication device connected to the radio packet communication networks 40, 45, and 46 constructed by the corresponding carrier, respectively, and corresponds to the communication standard as well as the communication protocol and service independently defined by each carrier. The high-level equipment 10, as described above, is designed to correspond to a specific carrier and the service provided by that carrier. Specifically, it is designed to connect the communication module corresponding to the service and correspond to the connection protocol and authentication protocol, and the like corresponding to that service.

The high-level equipment 10 according to the present embodiment is assumed to be directly connectable to the communication module 25 of PDC standard and the communication module 26 of PHS standard, and is assumed to be connectable to the corporate LAN 50 through each of the radio packet communication networks 45 and 46 by using the communication modules 25 and 26. The communication device 1 according to the present embodiment, without changing or modifying the high-level equipment 10, by using the communication module 20 of CDMA standard, is assumed to be connectable to the corporate LAN 50 through the radio packet communication network 40. The connection adapter 1 will be further described below in detail.

Figure 4:
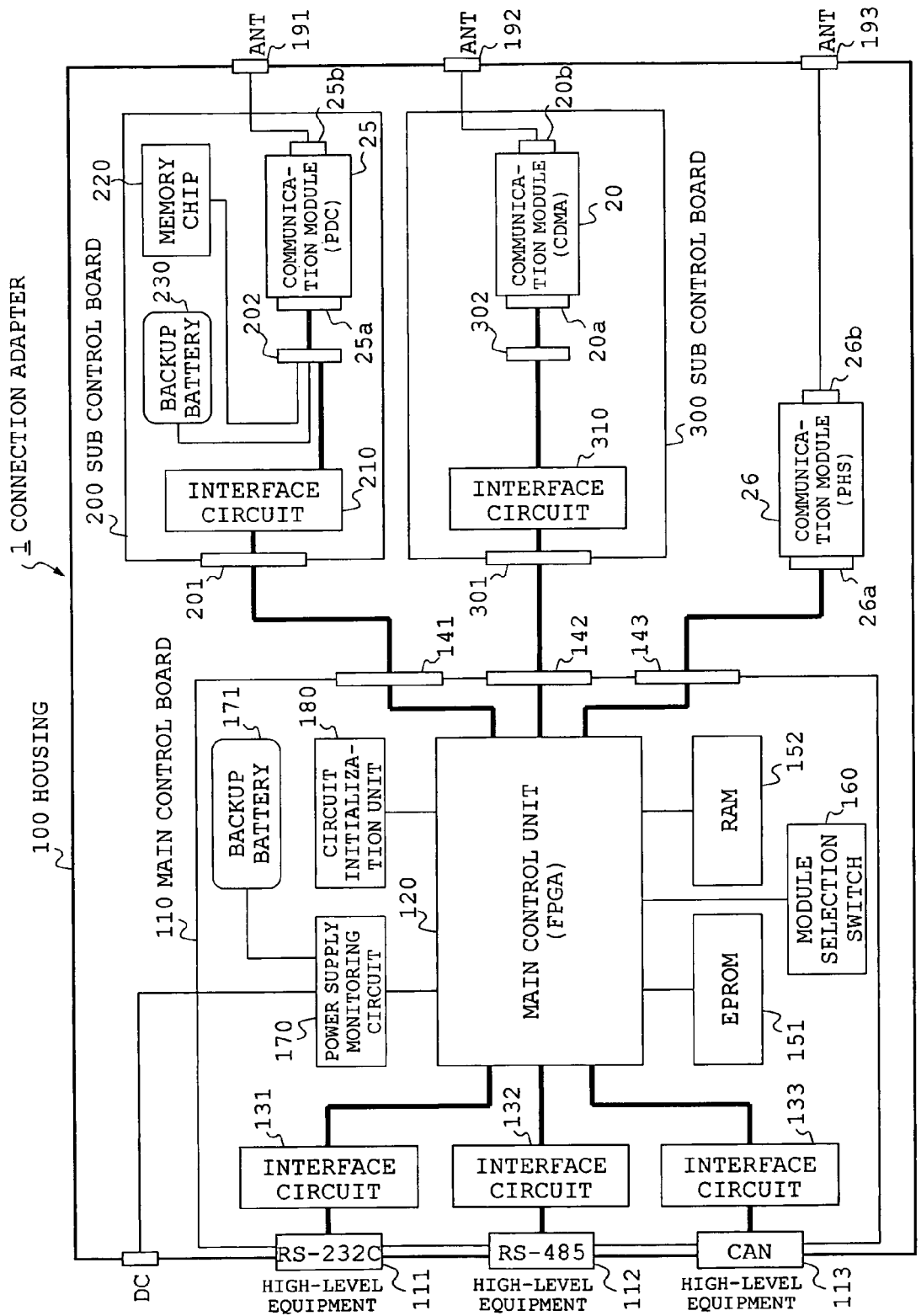
FIG. 4 is a block diagram of a connection adapter.

First, a block diagram of the connection adapter 1 according to the present embodiment will be described with reference to FIG. 4. FIG. 4 shows a state in which the three communication modules 20, 25, and 26 are built into the connection adapter 1. At the operating time, the communication modules 20, 25 or 26 only at least actually used may be built into the connection adapter 1.

Within a housing 10, the connection adapter 1 includes a main control board 110, a sub control board 200 for mounting the communication module 25 of PDC standard, a sub control board 300 for mounting the communication module 20 of CDMA standard, and the communication module 26 of PHS standard. The sub control boards 200 and 300 as well as the communication module 26 are provided detachably attachably to the main board 110.

Further, the connection adapter 1 according to the present embodiment comprises a plurality of types of connectors for connection to a plurality of types of high-level equipment. Specifically, the connection adapter 1 comprises a connector 111 used in the main control board 110 by RS-232C standard, a connector 112 used by RS-485 standard, and a connector 113 used by CAN (Controller Area Network) standard.

The main control board 110 is provided with a main control unit 120 implemented by FPGA (Field Programmable Gate Array) which is one kind of PLD (Programmable Logic Device), an interface circuit 131 of RS-282C standard, an interface circuit 132 of RS-485 standard, and an interface circuit 133 of CAN standard. Each of the interface circuits 131, 132, and 133 is interposed between the corresponding connectors 111, 112, and 113 and the main control unit 120. In this manner, the main control unit 120 can communicate with the high-level equipment connected to the connectors 111, 112, and 113 through each of the interface circuits 131, 132, and 133.

Further, the main control board 110 comprises a connector 141 for connection to the sub control board 200, a connector 142 for connection to the sub control board 300, and a connector 143 for connection to the communication module 26 of PHS standard. Each of the connectors 141, 142, and 143 is connected to the main control unit 120. In this manner, the main control unit 120 can communicate with the communication module 25 of PDC standard through the sub control board 200, and can communicate with the communication module 20 of CDMA standard through the sub control board 300, and also can directly communicate with the communication module 26 of PHS standard.

Further, the main control board 110 is provided with an EPROM 151 storing a control program of the main control unit 120 and a RAM 152 which is used as various work areas of the main control unit 120. Further, the main control board 110 is provided with a module selection switch 160 for selecting which one from among communication module 20, 25 or 26 is to be used. The main control unit 120 performs an operation corresponding to each of the communication modules 20, 25, and 26 selected by the module selection switch 160. The configuration and operation of the main control unit 120 will be described later.

This main control board 110 is operated by receiving DC power from the outside. The main control board 110 supplies DC power to the sub control boards 200 and 300 as well as the communication module 26 of PHS standard through each of the connectors 141, 142 and 143. The main control unit 120 comprises a power supply monitoring circuit 170 for monitoring an interruption of DC power supply from the outside and a backup battery 171. The power supply monitoring circuit 170, when detecting the power supply interruption from the outside, performs a control to supply DC power from the backup battery 171 to the main control board 110 and the sub control boards 200 and 300 as well as the communication module 26 of PHS standard. Also, the power supply monitoring circuit 170, when detecting the power supply interruption from the outside, notifies the interruption to the main control unit 120. Further, the power supply monitoring circuit 170, when detecting the recovery of the power supply from the outside after the recurrence of the power supply interruption, notifies the recovery to the main control unit 120.

The main control board 110 is provided with a circuit initialization unit 180 for initializing and generating an internal circuit of the main control unit 120 implemented by FGPA. The circuit initialization unit 180 has a built-in program for initializing and generating the internal circuit of the main control unit 120 and by instructions from a terminal (not shown) connected to the outside, a circuit constituting the main control unit 120 within FPGA is formed.

The sub control board 200 is a board for connecting the main control board 110 and the communication module 25 of PDC standard, and comprises a connector 201 for connection to the main control board 110, a connector 202 for connection to a terminal 25a of the communication module 25 of PDC standard, and an interface circuit 210 for connecting the main control board 110 and the communication module 25. The interface circuit 210 converts the number of pins or pin assignment between the connector 202 and the connector 201 and performs shapes waveforms, and the like. Here, assume that the communication module 25 according to the present embodiment requires a predetermined memory chip having stored its own telephone number and the like, and also requires a dedicated backup battery. In order to meet this requirement, in the sub control board 200, the memory chip 220 and the backup battery 230 are constructed to connect to the communication module 25 through the connector 202. As described above, the sub control board 200 operates by receiving DC power from the main control board 110, and supplies DC power to the communication module 25 through the connector 202. Antenna connection terminal 25b of the communication module 25 is connected to antenna connection terminal 191 attached to the housing 100.

The sub control board 300 is a board for connecting the main control board 110 and the communication module 20 of CDMA standard. The sub control board 300 includes a connector 301 for connection to the main control board 110, a connector 302 for connection to a terminal 20a of the communication module 20 of CDMA standard, and an interface circuit 310 connecting the main control board 110 and the communication module 20. The interface circuit 310 converts the number of pins or pin assignment between the connector 302 and connector 301 and performs shapes waveforms, and the like. As described above, the sub control board 300 operates by receiving DC power from the main control board 110, and supplies DC power to the communication module 20 through the connector 302. An antenna connection terminal 20b of the communication module 20 is connected to an antenna connection terminal 192 attached to the housing 100.

A terminal 26a of a communication module 26 of PHS standard is connected to a connector 143 of the main control board 110. An antenna connection terminal 26b of the communication module 26 is connected to an antenna connection terminal 193 attached to the housing 100.

Figure 5:
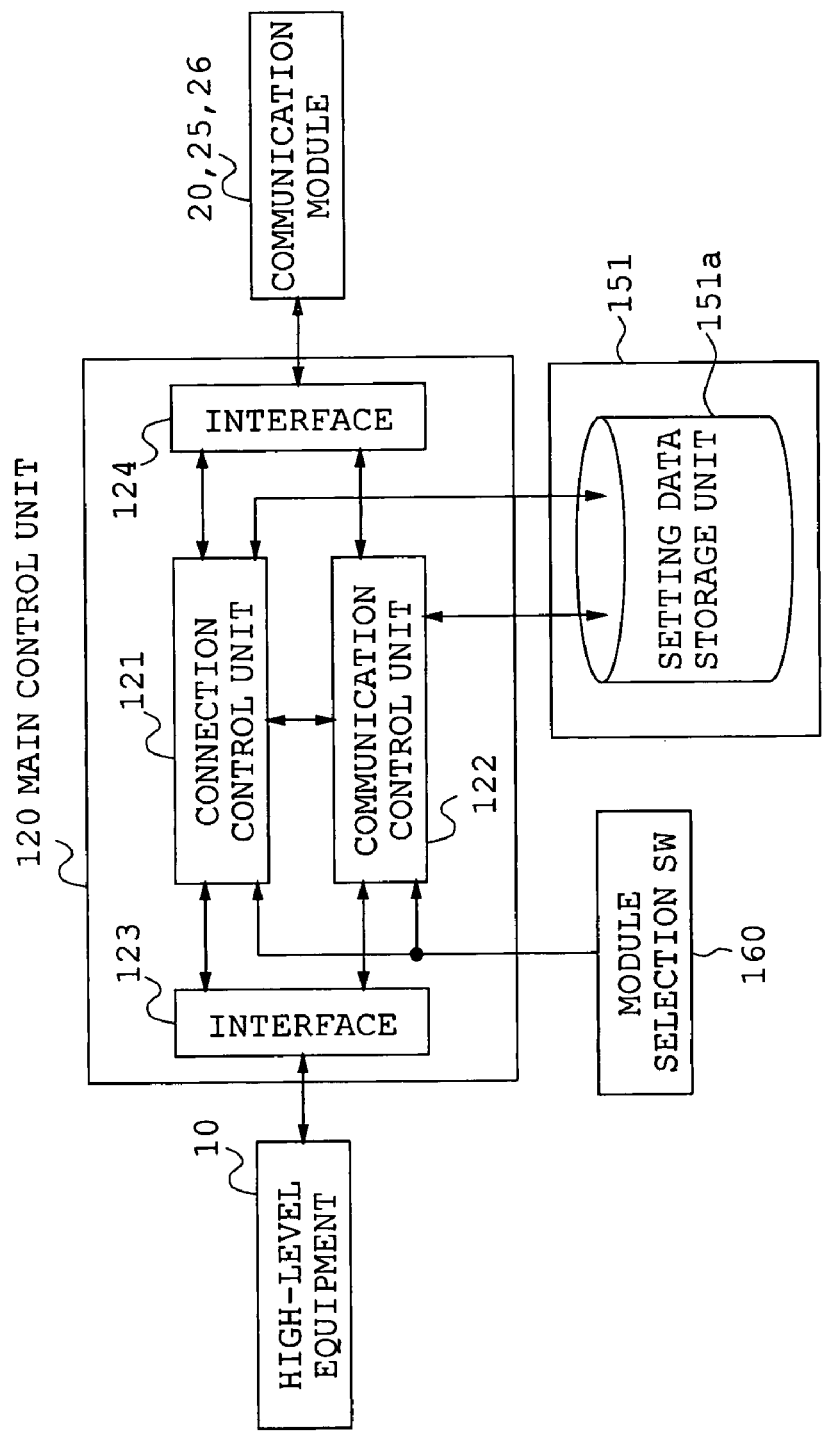
FIG. 5 is a functional block diagram of a main control unit of the connection adapter.

Next, the configuration and the operation of the main control unit 120 will be described with reference to FIG. 5. FIG. 5 is a functional block diagram of the main control unit 120. Here, only main points of the present invention will be disclosed, and other configurations will be omitted.

As shown in FIG. 5, the main control unit 120 comprises a connection control unit 121 performing a circuit control such as establishment of a circuit connection, a communication control unit 122 controlling data communication on the circuit established by the connection control unit 121, an interface 123 with the high-level equipment 10, and an interface 124 with communication modules 20, 25, and 26. The connection control unit 121 performs a circuit connection control by AT command and a connection control of an IP layer by LCP (Link Control Protocol) and IPCP. The communication control unit 122 performs a conversion processing of the IP address included in the header of the IP layer in the data communication on the circuit established by the connection control unit 121.

The connection control unit 121 and the communication control unit 122 switch over the processing according to the communication modules 20, 25, and 26 selected by a module selection switch 160. In the present embodiment, the high-level equipment 10 is designed to be able to directly connect and use the communication modules 25 and 26. Hence, the connection control unit 121 and the communication control unit 122, when the communication module 25 or 26 is selected by the module selection switch 160, allow the data between the high-level equipment 10 and the communication module 25 or 26 to transmit without performing a specific processing. On the other hand, when the communication module 20 is selected, the connection control unit 121 and the communication control unit 122 perform processing such as conversion, transmission, discard, and the like for the data between the high-level equipment 10 and the communication module 20 according to a predetermined rule. The data required for these data processings are stored in a setting data storage unit 151a of the EPROM 151.

The data stored in the setting data storage unit 151a will be described with reference to FIG. 6. As shown in FIG. 6, the setting data storage unit 151a stores a calling command (including a telephone number) for connection to the radio packet communication network 40, a fixed IP address of the high-level equipment 10, an authentication data necessary for connection to the radio packet communication network 40, and an IP address of the router 60 of the connection destination.

Figures 7, 8:
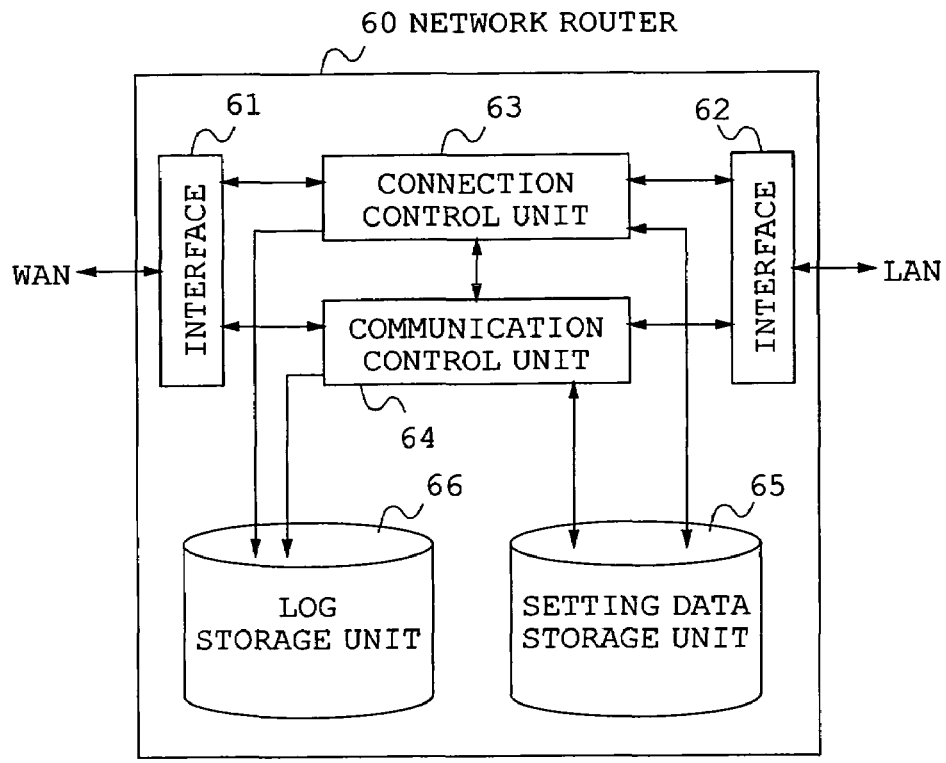
FIG. 7 is a functional block diagram of a network router.
FIG. 8 is a view for explaining an example of a high-level equipment information table.

Next, the router 60 provided at a boundary point between the radio packet communication network 40 and the corporate LAN 50 will be described with reference to FIG. 7. FIG. 7 is a block diagram of the router. The router 60, as shown in FIG. 7, comprises a WAN side interface 61, a LAN side interface 62, a connection control unit 63 performing a circuit control such as establishment of a circuit connection, a communication control unit 64 performing a control of data communication, a setting data storage unit 65 storing data necessary for the operation at the communication control unit 64, and a log memory unit 66 storing an operation history of the connection control unit 63 and the communication control unit 64. The connection control unit 63 performs a connection control of the IP layer in collaboration with the connection adapter 1 and the messaging server 42. The communication control unit 64 performs conversion of the IP address included in the header of the IP layer on the circuit established by the connection control unit 63. The setting data storage unit 65 stores at least data necessary for the address conversion in the communication control unit 64.

The predetermined data storage unit 65, as shown in FIG. 8, stores a fixed IP address (fixed terminal IP address) allotted to the high-level equipment 10, and a high-level equipment information table 65a enumerating a set of telephone numbers of the communication module 20 connected to the high-level equipment 10. Here, the fixed terminal IP address is allotted to the high-level equipment 10 when the network connection service giving the fixed IP address is used referring to FIG. 2. Further, the setting data storage unit 65 comprises an address conversion table 65b storing a set of IP addresses converting the addresses by the communication control unit 64 for each communication. Specifically, as shown in FIG. 9, the address conversion table 65b stores a communication ID which is management information identifying each communication, a set the fixed terminal IP address and the IP address (dynamic terminal IP address) dynamically given to the connection adapter 1 of the high-level equipment 10 having the fixed terminal IP address, and a set of the IP address of the management computer 51 which is a communication destination of the high-level equipment 10 and the WAN side IP address of the router 60. Each entry of this address conversion table 65b is generated every time the communication is established between the management computer 51 and the high-level equipment 10, and is discarded upon completion of the communication. In the present embodiment, the IP address of the management computer 51 does not use a value fluctuating for each communication, but a value fixedly set in advance.

Next, a communication procedure in the present system will be described with reference to the drawing. First, prior to the description of the communication system according to the present embodiment, the communication procedure in case of using the network connection service premised on the high-level equipment 10 and the management computer 51 will be described with reference to the drawing. As described above, since the high-level equipment 10 corresponds to the communication module 25 of PDC standard and a first radio packet communication network 45, the connection adapter 1 does not perform any process for the data between the high-level equipment 10 and the communication module 25, nor does the router 60 perform any specific process. In case the high-level equipment 10 is connected to the corporate LAN 50 by using the communication module 26 of PHS standard and the radio packet communication network 46, the same operation will be performed.

First, referring to the sequence chart of FIG. 10, a description will be made on a case of starting a communication from the high-level equipment 10 to the management computer 51.

Here, assume the content as shown below. That is, assume that: the communication module 25 is allotted with a telephone number [080AABB] from a carrier, and from this carrier, an IP address 192.168.0.0/28 is distributed: and the high-level equipment 10 connected to the radio packet communication network 45 by using the communication module 25 is allotted with an IP address 192.168.0.1. The IP address of the management computer 51 of the communication destination is assumed as 192.168.9.10. The communication module 25 is assumed as being connected to the relay device of the radio packet communication network 45 by calling a telephone number [080CCDD] by [ATDT] command.

Figure 10:
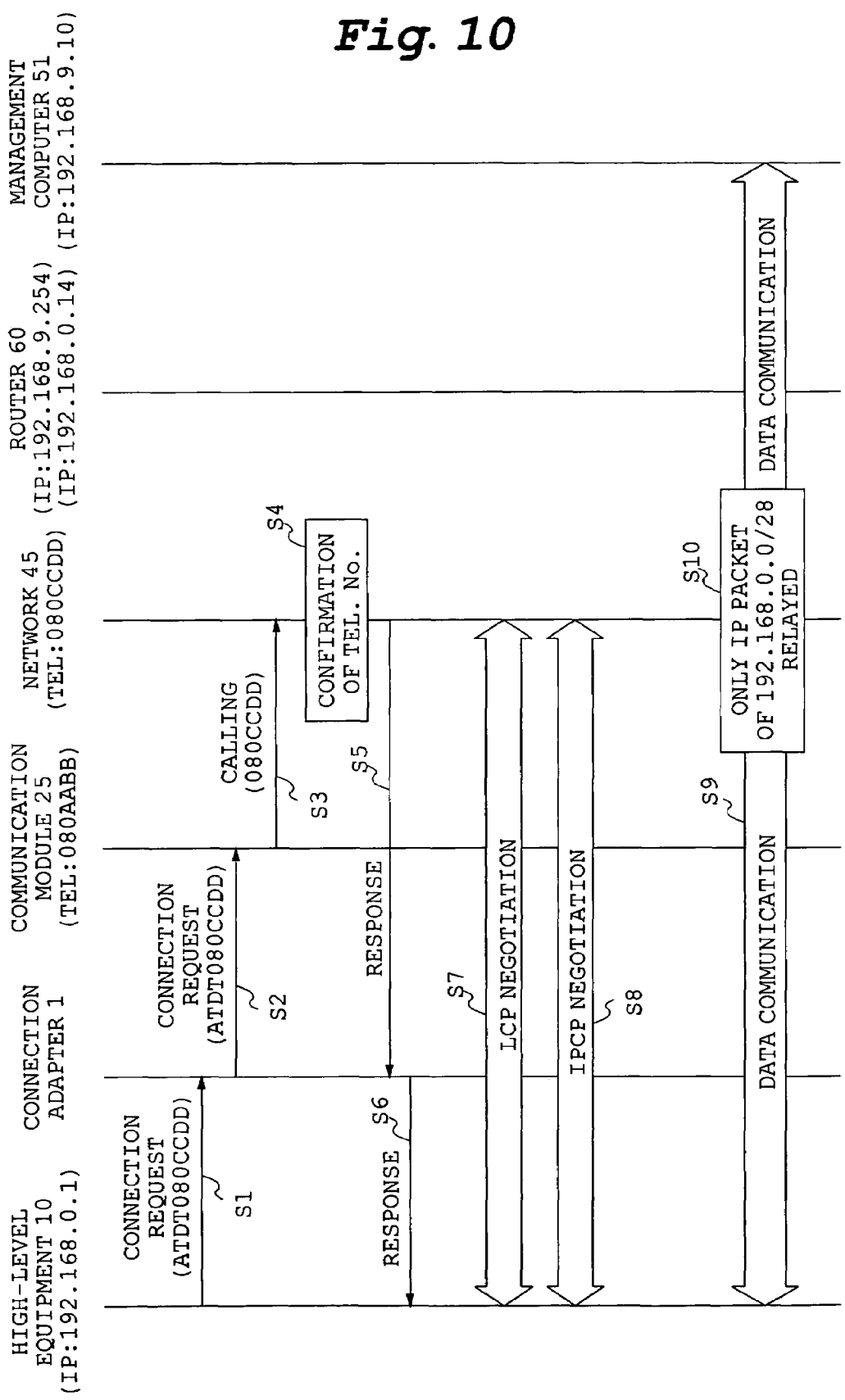
FIG. 10 is a view for explaining a sequence in case of using an assumed network connection service and starting a communication from high-level equipment.

As shown in FIG. 10, when the high-level equipment 10 calls an [ATDT080CCDD] command (step S1) to the connection adapter 1, the connection control unit 121 of the connection adapter 1 transfers the command to the communication module 25 as it is (step S2). As the momentum of this calling, a momentum such as when the IP packet of the destination address: 192.168.0.10 is generated can be cited. By this AT command, the communication module 25 calls the relay device within the radio packet communication network 45 (step S3). Here, the relay device confirms the telephone number of the sender communication module 25, and refuses the connection from a terminal other than under contract (step S4). The connection control unit 121 of the connection adapter 1, upon receipt of a response [CONNECT] to the effect that a connection has been completed at a circuit level through the communication module 25 (step S5), transfers the response to the high-level equipment 10 (step S6).

Next, the high-level equipment 10 starts a processing for connection to the corporate LAN 50 through the radio packet communication network 45 by PPP. Specifically, the high-level equipment 10 establishes a connection at an IP level with the relay device of the radio packet communication network 45 by LCP and IPCP (steps S7 and S8). Here, the connection control unit 121 of the connection adapter 1 transmits the packet relating to the LCP and IPCP bidirectionally. Thus, the high-level equipment 10 and the corporate LAN 50 can communicate with each other at the IP level, and subsequently start data communication using a high-level protocol such as TCP/UDP and the like (step S9). The relay device of the radio packet communication network 45 relays the IP packet only in which the destination or the sender IP address is included in 192.168.0.0/28 (step S10).

Figure 11:
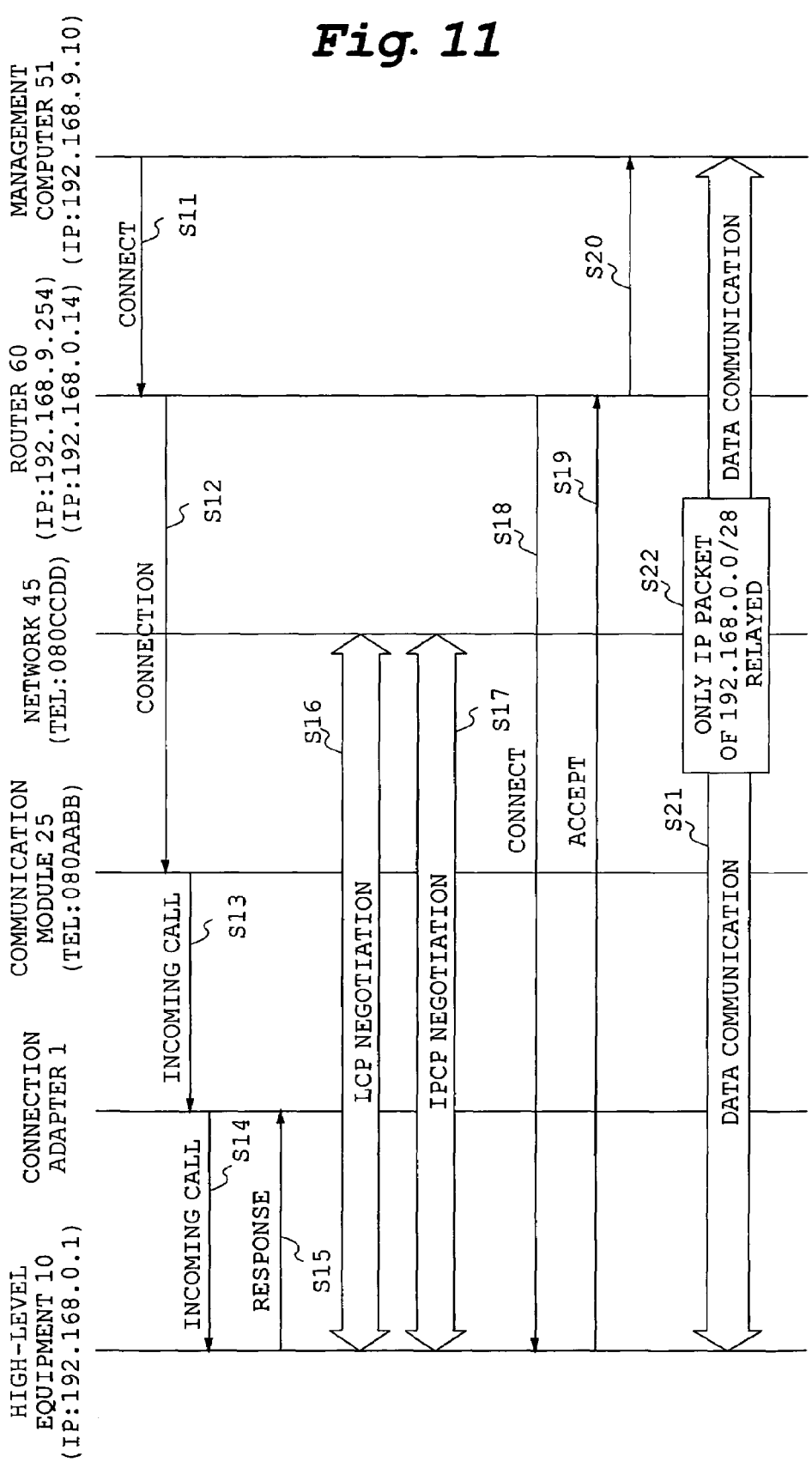
FIG. 11 is a view for explaining a sequence in case of using an assumed network connection service and starting a communication from a management computer.

Next, referring to the sequence chart of FIG. 11, a description will be made on the case where a communication is started from the management computer 51 to the high-level equipment 10.

When the management computer 51 issues a connection request with the fixed IP address allotted in advance to the high-level equipment 10 as a destination in order to communicate with the high-level equipment 10 of the communication destination (step S11), the router 60 sends the packet to the radio packet communication network 40 according to the usual routing rule. In this manner, the relay device of the radio packet communication network 45 refers to the destination IP address of the packet and connects to the communication module 25 of the telephone number corresponding to the IP address (step S12). The communication module 25 notifies the connection adapter 1 to the effect that the incoming call was received (step S13). The connection adapter 1 relays the incoming call notice to the high-level equipment 10 (step S14). Next, the connection adapter 1, upon receipt of a response to the incoming call notice from the high-level equipment 10 (step S15), starts a connection establishment processing with the relay device by PPP. Specifically, the connection adapter 1 establishes a connection at the IP level with the relay device of the radio packet communication network 45 by LCP and IPCP (steps S16 and S17). Here, the connection control unit 121 of the connection adapter 1 transmits the packet relating to the LCP and IPCP bidirectionally. Thus, the high-level equipment 10 and the corporate LAN 50 can communicate with each other at the IP level, and subsequently, the data communication using a high-level protocol such as TCP/UDP and the like (step S18) can be made therebetween. Hence, the router 60 relays the connection request of the step S11 to the high-level equipment 10 (step S18). Then, the router 60 relays the response (step S19) from the high-level equipment 10 to the management computer 51 (step S20). Thus, the high-level equipment 10 and the corporate LAN 50 can communicate each other at the IP level, and subsequently the data communication using the high-level protocol such as TCP/UDP and the like is started. The relay device of the radio packet communication network 45 relays the IP packet only, in which the destination or the sender IP address is included in 192.168.0.0/28 (step S22).

Next, referring to the drawings, a description will be made on a case of using the communication module 20 of CDMA standard and the radio packet communication network 40 without adding any modification or change on this high-level equipment 10 or the management computer 51.

Figure 12:
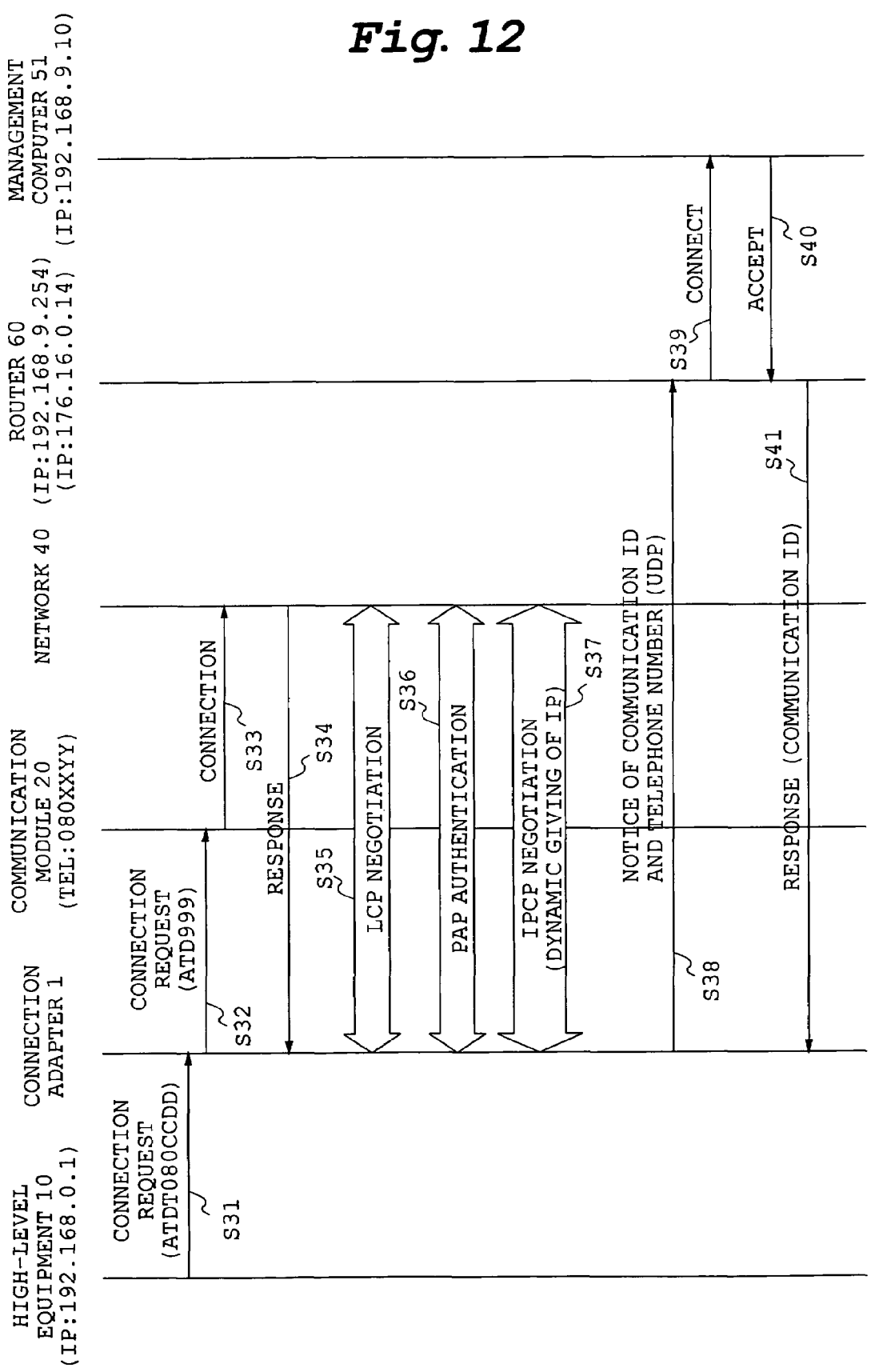
FIG. 12 is a view for explaining a sequence in case of starting a communication from high-level equipment in the first embodiment.
Figure 13:
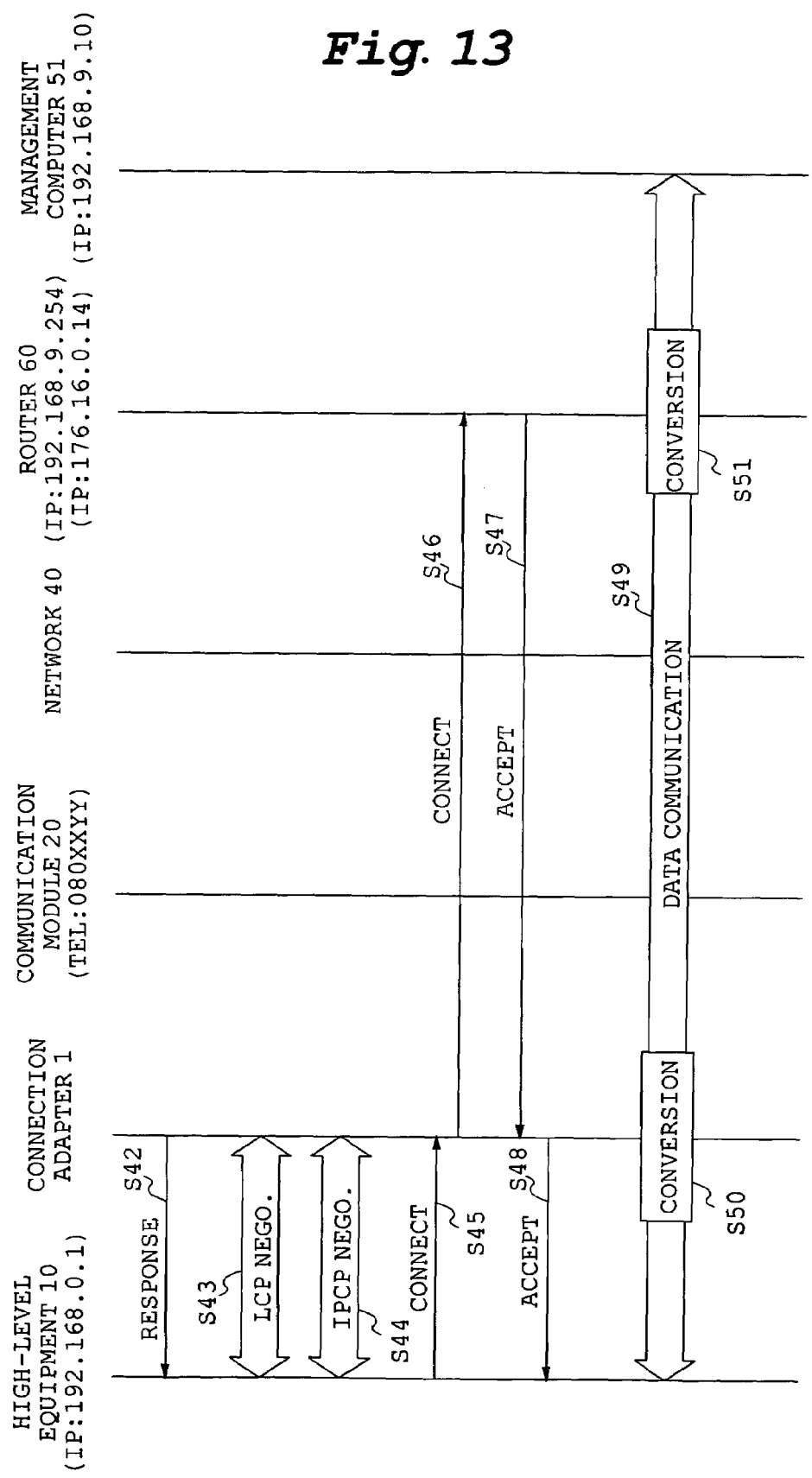
FIG. 13 is a view for explaining a sequence in case of starting a communication from high-level equipment in the first embodiment.

First, referring to FIGS. 12 to 14, a description will be made on a case of starting a communication from the high-level equipment 10 to the management computer 51. FIGS. 12 and 13 are sequence charts in case of starting a communication from the high-level device to the management computer, and FIG. 14 is a view for explaining a conversion process of the IP address described in the header of the IP packet transmitted from the high-level equipment.

Here, assume the content as shown below. That is, assume that the communication module 20 is allotted with a telephone number [080XXYY] from a carrier. From the carrier, an IP address 172.16.0.0/28 is distributed, and assume that the high-level equipment 10 connected to the radio packet communication network 40 by using the communication module 20 is dynamically allotted with one from among the IP address 172.16.0.0/28. Assume that the router 60 is allotted with the address 172.26.0.14. Assume that the IP address of the management computer 51 of the communication destination is 192.168.9.10. The communication module 20 is connected to the relay device 41 of the radio packet communication network 40 by calling [ATD9999] command. The relay device 41 performs a user authentication by PAP, and specifies a connection destination (the corporate LAN 50 in the present embodiment).

As shown in FIG. 12, when the high-level equipment 10 calls a [ATDT080CCDD] command for the connection adapter 1 (step S31), the connection control unit 121 of the connection adapter 1 converts the command into [ATD9999] and transmits it to the communication module 20 (step S32).

Figure 14:
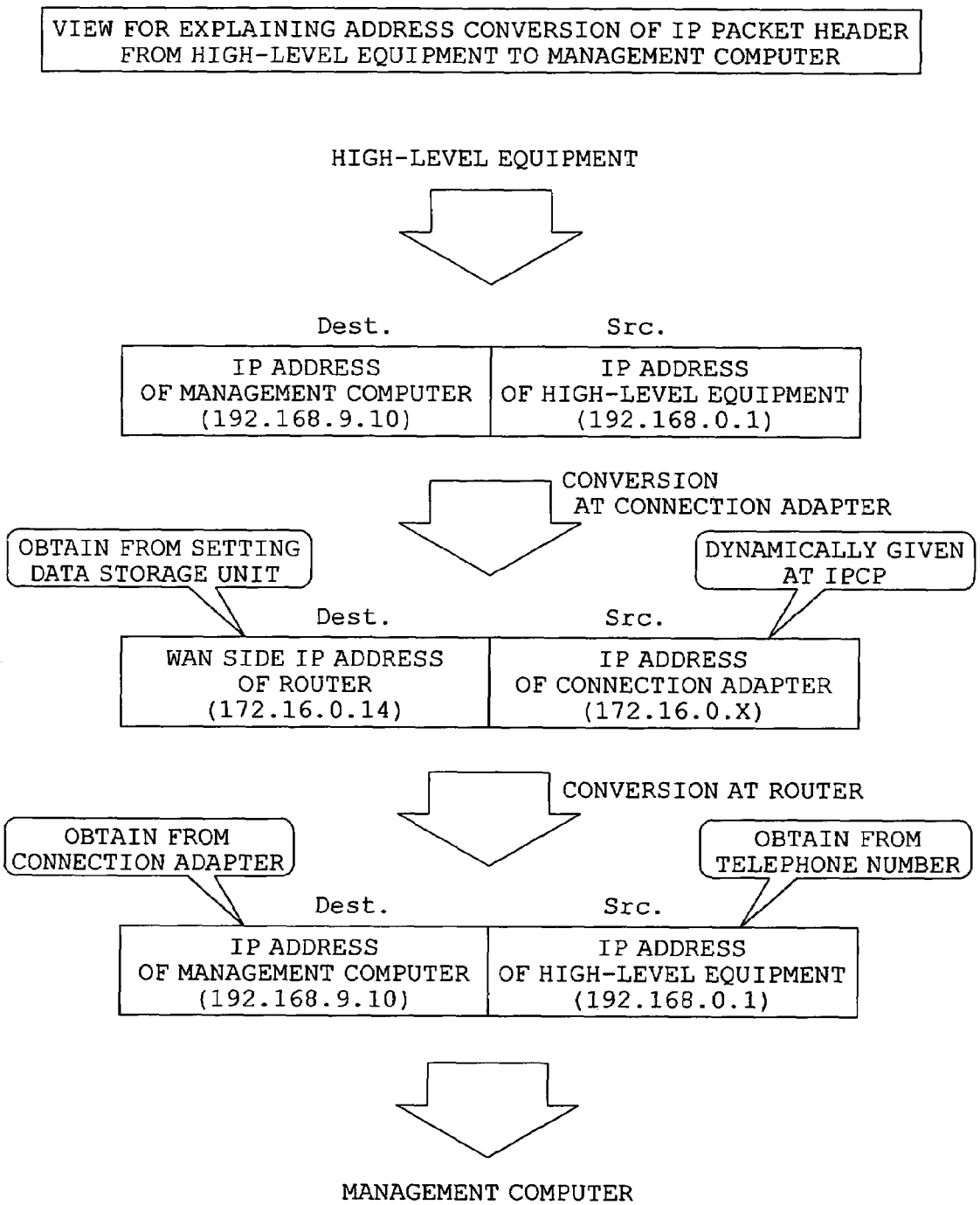
FIG. 14 is a view for explaining an address conversion processing.

As the momentum of this calling, a momentum such as when the IP packet of the destination address: 192.168.9.10 as shown in FIG. 14 is generated can be cited. The communication module 20 calls the relay device 41 within the radio packet communication network 40 by the AT command (step 33). The connection control unit 121 of the connection adapter 1, upon receipt of a response [CONNECT] to the effect that a connection has been completed at a circuit level through the communication module 20 (step S34), starts a processing for connecting the connection adapter 1 to the corporate LAN 50 by PPP.

First, the connection control unit 121 of the connection adapter 1 starts a LCP negotiation with the relay device 41 of the radio packet communication network 40 (step S35). Next, the connection control unit 121 of the connection adapter 1 performs PAP authentication processing with the relay device 41 of the radio packet communication network 40 (step S36). Although this PAP authentication processing is not assumed in the high-level equipment 10 prepared for the radio packet communication network 45, it is necessary when using the radio packet communication network 40. Hence, in the present embodiment, the connection adapter 1 performs the authentication processing on behalf of the high-level equipment 10. When this authentication processing is completed, the connection control unit 121 of the connection adapter 1 starts IPCP negotiation between the connection adapter 1 and the relay device 41 of the radio packet communication network 40 (step S37). In this manner, IPCP negotiation is completed, and the connection control unit 121 of the connection adapter 1 is given a dynamic IP address: 172.16.0.X from the radio packet communication network 40. The given dynamic IP address is stored in the storage unit such as the EPROM 151.

When PPP negotiation is completed, the connection control unit 121 of the connection adapter 1 notifies the router 60 of the telephone number of the communication module 20 and the communication ID having a specific value (for example, 0) showing a call from the high-level equipment 10 by UDP packet (step S38). The connection control unit 63 of the router 60 having received the notice from the connection adapter 1 registers an entry in the address conversion table 65*b* with respect to the communication ID included in the notice. Specifically, the communication ID included in the notice, the fixed terminal IP address obtained from the high-level equipment information table 65*a*, the sender IP address (=dynamic terminal IP address) of the packet having stored the notice, the predetermined IP address of the management computer 51, and the WAN side IP address of the router 60 are registered in the address conversion table 65*b*. In this manner, the address conversion table 65*b* is aligned with data necessary for the address conversion in the communication.

Next, the connection control unit 63 of the router 60 sends a connection request [CONNECT] at the IP layer to the management computer 51 (step S39). At this time, the sender IP address of the IP packet uses the fixed IP address of the high-level equipment 10. That is, the packet according to this connection request takes a connection request in advance, which is issued by the high-level equipment 10 in the processing of the subsequent steps S45 to S48. The IP addresses of the high-level equipment 10 and the management computer 51 are obtained by referring to the address conversion table 65*b*.

Next, the connection control unit 63 of the router 60, upon receipt of a response [ACCEPT] for the connection request (step S40), transmits a response including the communication ID to the connection adapter 1 as a response to steps S38 (step S41). The destination IP address of the response received from the management computer 51 is the fixed IP address of the high-level equipment 10. However, the connection control unit 63 of the router 60 does not relay the packet to the radio packet communication network 40 at this stage.

The connection control unit 121 of the connection adapter 1 having received the response from the router 60 transmits a response [connect] to the effect that a connection has been completed at the circuit level to the high-level equipment 10 (step S42). The high-level equipment 10, upon receipt of the response, starts LCP negotiation and IPC negotiation (steps S43 and S44). Here, worth noting is that the connection control unit 121 of the connection adapter 1 responds to the high-level equipment 10. In this manner, it looks like the high-level equipment 10 refers to FIG. 10 and performs a connection processing with the packet communication network 45.

By the above described processing, it is possible to perform a communication of IP level between the high-level equipment 10 and the connection adapter 1 and between the connection adapter 1 and the management computer 51. Hence, the high-level equipment 10 sends a connection request [CONNECT] at the IP layer to the management computer 51 (step S45). This connection request corresponds to the initial packet of the data communication in step S9 of FIG. 10. Consequently, the destination IP address is an IP address of the management computer 51, and the sender IP address is a fixed terminal IP address of the high-level equipment 10. The connection control unit 121 of the connection adapter 1, with respect to this connection request, converts the destination IP address into the WAN side IP address of the router 60, and converts the sender IP address into the dynamic terminal IP address given from the radio packet communication network 40 and sends it to the router 60 (step S46). The connection control unit 63 of the router 60 responds to the connection adapter 1 for the connection request (step S47). The connection control unit 121 of the connection adapter 1 having received the response converts the destination IP address into the fixed terminal IP address of the high-level equipment 10, and converts the sender IP address into the IP address of the management computer 51, and sends it to the high-level equipment 10 (step S48).

By the above described processing, the high-level equipment 10 determines that the connection to the management computer 51 has been completed, and starts a data communication to the management computer 51 (step S49). Here, the communication control unit 64 of the router 60 and the communication control unit 122 of the connection adapter 1 perform an address conversion of the header of the IP packet (steps S50 and S51). Specifically, as shown in FIG. 14, the fixed terminal IP address (192.168.0.1) and the dynamic terminal IP address (172.16.0.X) are mutually converted, and the WAN side IP address (172.16.0.14) of the router 60 and the IP address (192.168.9.10) of the management computer 51 are mutually converted. By the above described processing, the communication starting from the high-level equipment 10 to the management computer 51 becomes possible.

Figure 15:
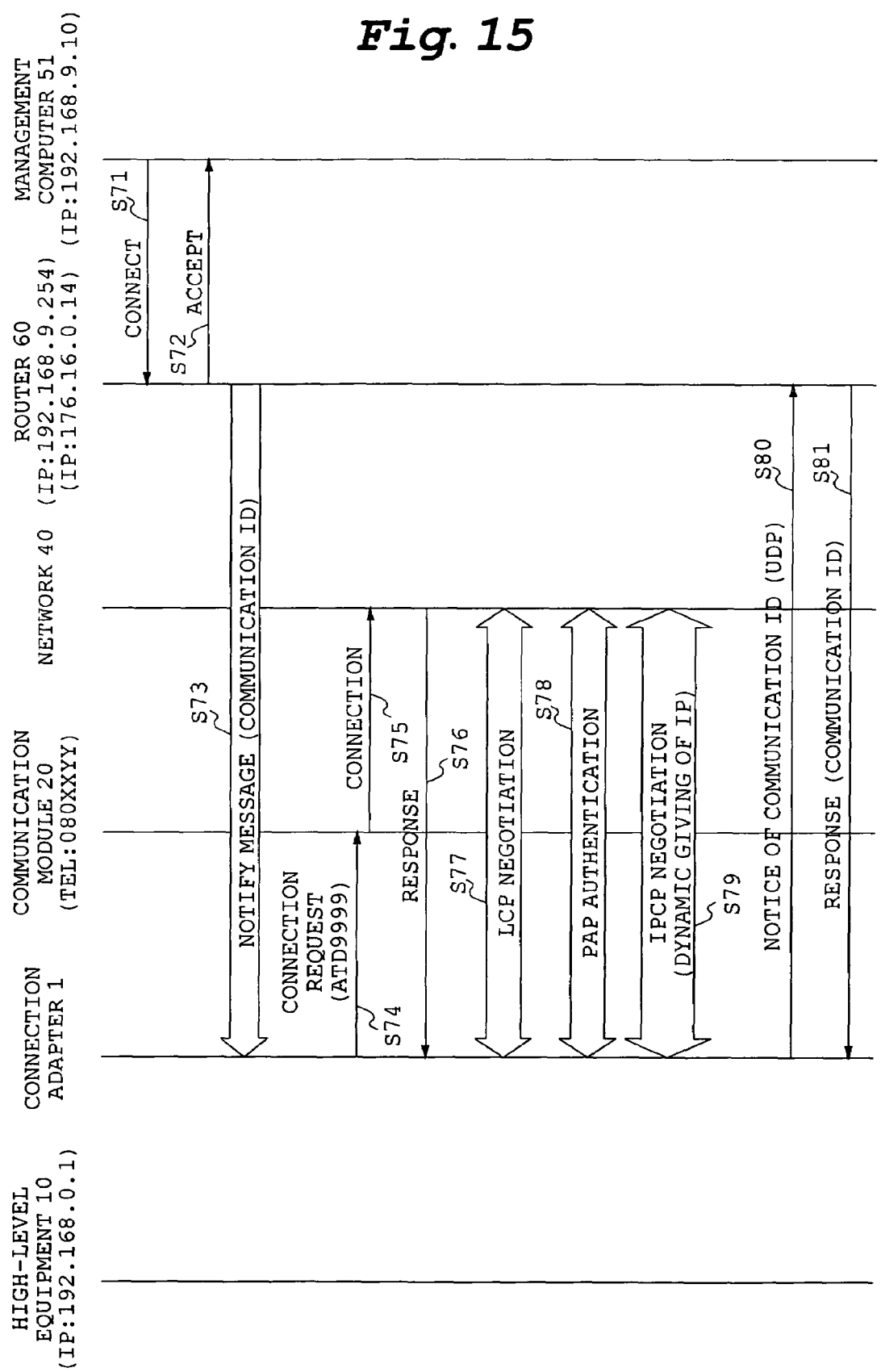
FIG. 15 is a view for explaining a sequence in case of starting a communication from the management computer in the first embodiment.
Figure 16:
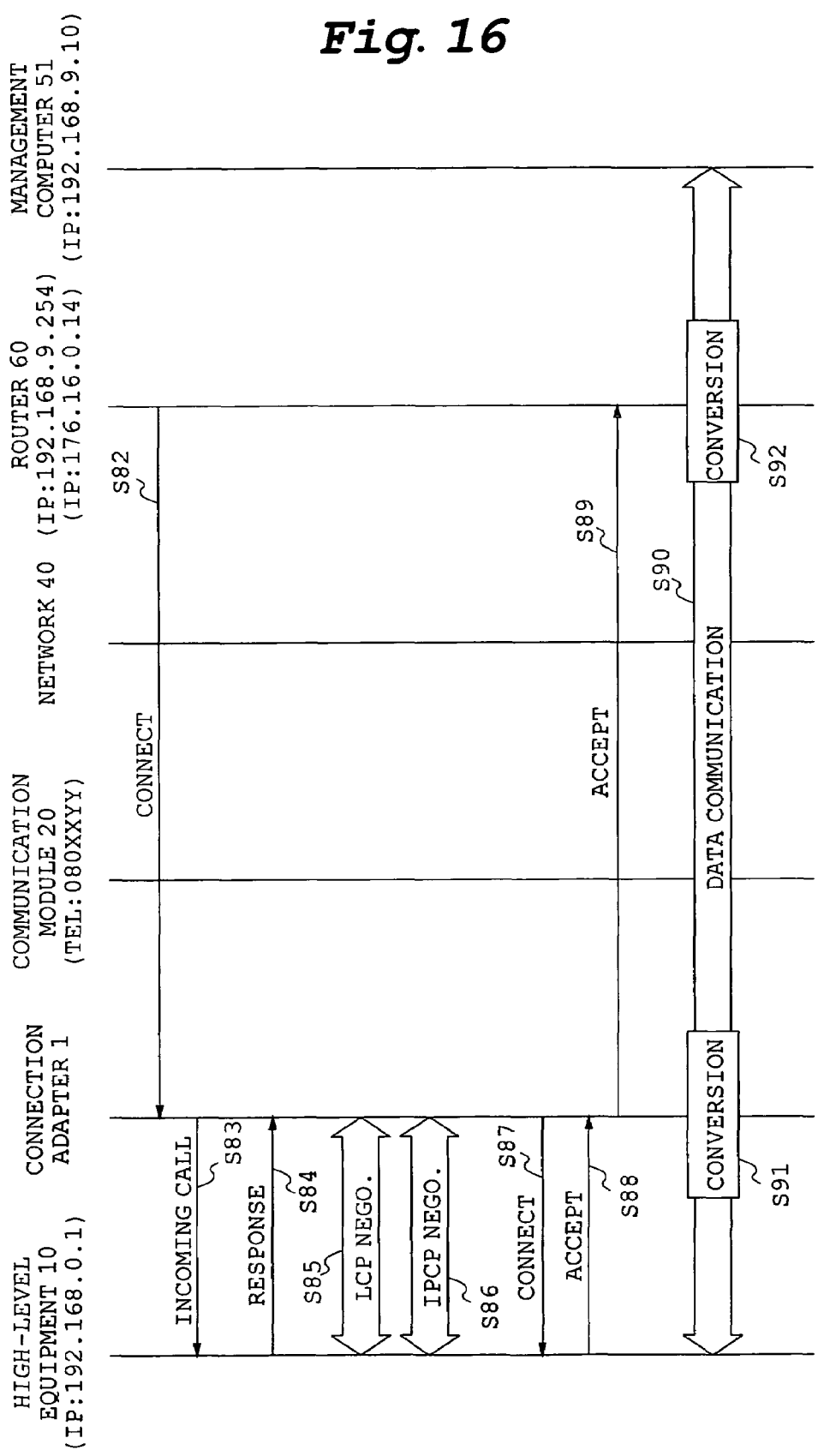
FIG. 16 is a view for explaining a sequence in case of starting a communication from the management computer in the first embodiment.
Figure 17:
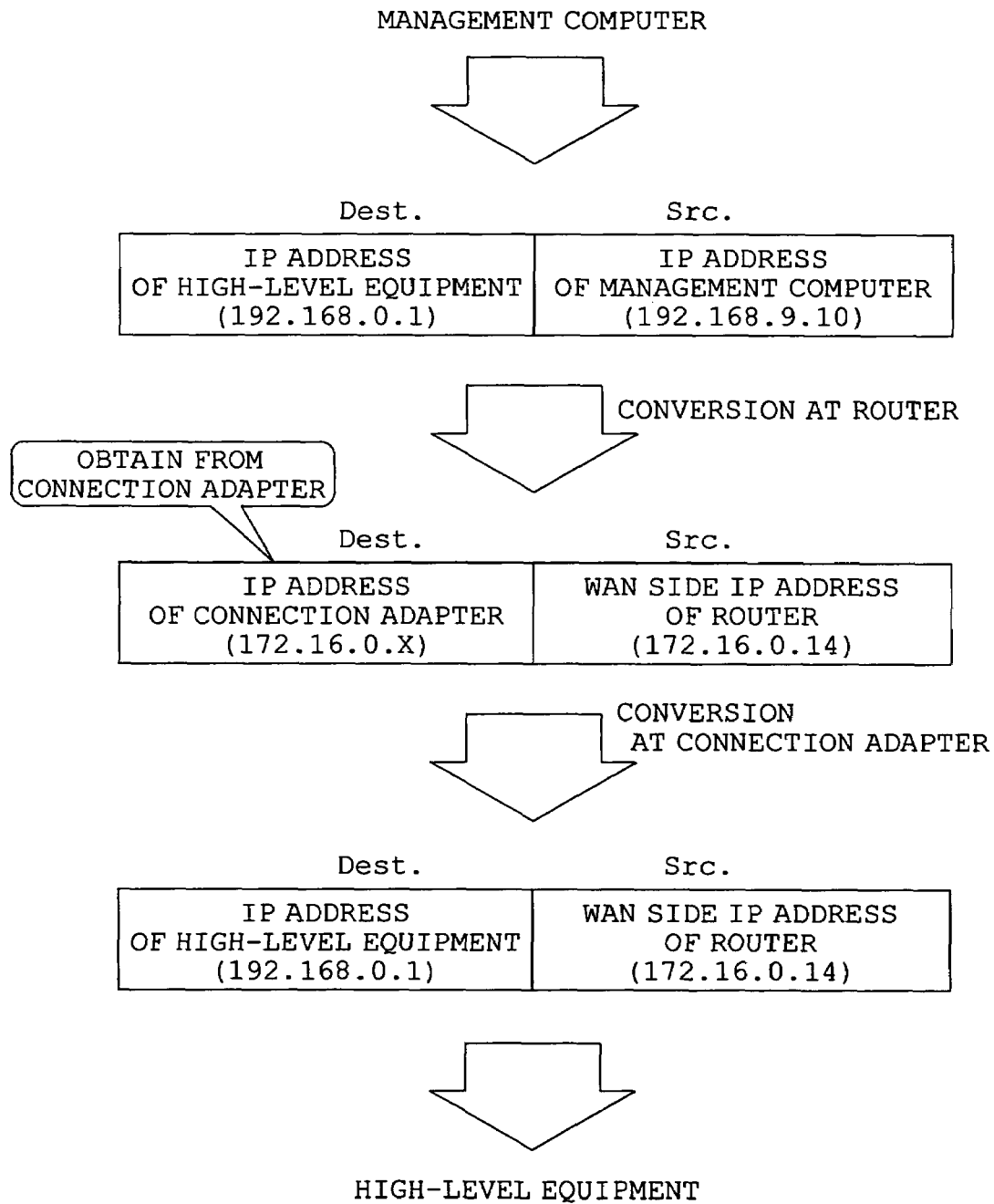
FIG. 17 is a view for explaining an address conversion processing.

Next, referring to FIGS. 15 to 17, a description will be made on a case of starting a communication from the management computer 51 of the corporate LAN 50 to the high-level equipment 10. FIGS. 15 and 16 are sequence views of the communication started from the management computer, and FIG. 17 is a view for explaining a process of the address conversion.

The management computer 51 issues a packet of the connection request [CONNECT] with the fixed terminal IP address allotted in advance to the high-level equipment 10 as a destination in order to communicate with the high-level equipment 10 of the communication destination (step S71). The connection control unit 63 of the router 60 returns a response to the management computer 51 for the connection request on behalf of the high-level equipment 10 (step S72).

Next, the connection control unit 63 of the router 60 obtains the telephone number corresponding to the destination IP address of the connection request packet from the high-level device information table 65*a*. The connection control unit 63 generates a communication ID in order to uniquely identify the communication, and registers an entry of the communication in the address conversion table 65*b*. The connection control unit 63 sends a message by using the messaging service to the obtained telephone number, that is, the connection adapter 1 connected to the high-level equipment 10 (step S73). Here, the transmission of the message is performed by asking the messaging server 42 to send the message by HTTP. Further, the message to be transmitted includes the communication ID.

The connection control unit 121 of the connection adapter 1 having received the message starts a connection processing to a first corporate LAN 50 based on a setting data stored in the setting data storage unit 151*a*. Specifically, the [ATD9999] command is sent to the communication module 20 (step S74). By this AT command, the communication module 20 calls the relay device 41 within the radio packet communication network 40 (step S75). Upon receipt of the response [CONNECT] to the effect that the connection has been completed at the circuit level through the communication module 20 (step S76), the connection control unit 121 of the connection adapter 1 starts a processing to connect the connection adapter 1 to the corporate LAN 50 by PPP.

First, the connection control unit 121 of the connection adapter 1 starts LCP negotiation with the relay device 41 of the radio packet communication network 40 (step S77). Next, the connection control unit 121 of the connection adapter 1 starts PAP authentication processing with the relay device 41 of the radio packet communication network 40 (step S78). Next, the connection control unit 121 of the connection adapter 1 starts IPCP negotiation between the relay device 41 of the radio packet communication network 40 and the connection adapter 1 (step S79). In this manner, IPCP negotiation is completed, and the connection control unit 121 of the connection adapter 1 is given the dynamic IP address: 172.16.0.X from the radio packet communication network 40. The given dynamic IP address is stored in the storing means such as the EPROM 151 and the like.

When PPP negotiation is completed, the connection control unit 121 of the connection adapter 1 transmits the communication ID received from the router 60 by UDP packet to the router 60 (step S80). The connection control unit 63 of the router 60 transmits a response including the communication ID to the connection adapter 1 (step S81), and with respect to the communication ID received from the connection adapter 1, registers the sender IP address (=dynamic terminal IP address) of the packet storing the communication ID and the WAN side IP address of the router 60 in the address conversion table 65*b*. In this manner, the address conversing table 65*b* is aligned with data necessary for the address conversion in the communication.

Next, the connection control unit 63 of the router 60 relays the connection request packet of the step S71 to the connection adapter 1 (step S82). At this time, the destination IP address of the connection request packet is converted into the dynamic terminal IP address of the connection adapter 1, and the sender IP address is converted into the WAN side IP address of the router 60. The connection control unit 121 of the connection adapter 1, upon receipt of the connection request, notifies the high-level equipment 10 of receipt of the incoming call (step S83). The high-level equipment 10, upon receipt of the incoming call notice, notifies the connection adapter 1 of a response to the incoming call notice (step S84), and starts LCP negotiation and IPCP negotiation (steps S85 and S86). Here, worth noting is that the connection control unit 121 of the connection adapter 1 responds to the high-level equipment 10. In this manner, it looks like the high-level equipment 10 refers to FIG. 1 and performs a connection processing with the packet communication network 45.

When this PPP negotiation is completed, the connection control unit 121 of the connection adapter 1 transfers the connection request packet received from the router 60 at the step S82 to the high-level equipment 10 (step S87). At this time, the destination IP address of the connection request packet is converted into the fixed terminal IP address of the high-level equipment 10. The high-level equipment 10 having received the connection request packet responds the response to the connection adapter 1 (step S88). The destination of this response packet and the sender IP address represent a value where the destination IP address of the connection request packet and the sender IP address are counterchanged. The connection adapter 1 converts the sender IP address into the dynamic terminal IP address of the connection adapter 1, and sends it to the router 60 (step S89).

By the above described processing, the high-level equipment 10 determines that the connection to the management computer 51 has completed, and starts the data communication to the management computer 51 (step S90). Here, the communication control unit 64 of the router 60 and the communication control unit 122 of the connection adapter 1 perform an address conversion of the header of the IP packet (steps S91 and S92). Specifically, as shown in FIG. 17, the communication control unit 64 of the router 60 mutually converts the fixed terminal IP address (192.168.0.1) and the dynamic terminal IP address (172.16.0.X) therebetween, and converts the WAN side IP address (172.16.0.14) of the router 60 and the IP address (192.168.9.10) of the management computer 51 therebetween. Further, the communication control unit 122 of the connection adapter 1 mutually converts the fixed terminal IP address (192.168.0.1) and the dynamic terminal IP address (172.16.0.X) therebetween.

As described above, in the system according to the present embodiment, the network connection service giving the dynamic IP address can be used without adding any change or modification to the high-level equipment 10 and the management computer 51 having used the network connection service giving the fixed IP address. More specifically, even when the network connection service giving the dynamic IP address is used, a communication from the management computer 51 to the high-level equipment 10 can be started. Further, since the sender IP address of the packet received by the management computer 51 is a fixed IP address allotted in advance to the high-level equipment 10, even when the communication to the management computer 51 from the high-level equipment 10 is started, the management computer 51 can specify the communication destination.

Further, in the connection adapter 1 according to the present embodiment, a change, discard, and transmission are performed so that the data flowing between the high-level equipment 10 and the communication modules 20, 25, and 26 can be normally processed in each equipment, and it is, therefore, possible to absorb various differences in the protocol service and the communication modules 20, 25 and 26 among each of the radio packet communication networks 40, 45 and 46.

Further, in the system according to the present embodiment, the high-level equipment 10 connecting to the management computer 51 can be disguised as other high-level equipment. Such disguising method will be described with reference to FIGS. 18 to 20.

Figures 18, 19:
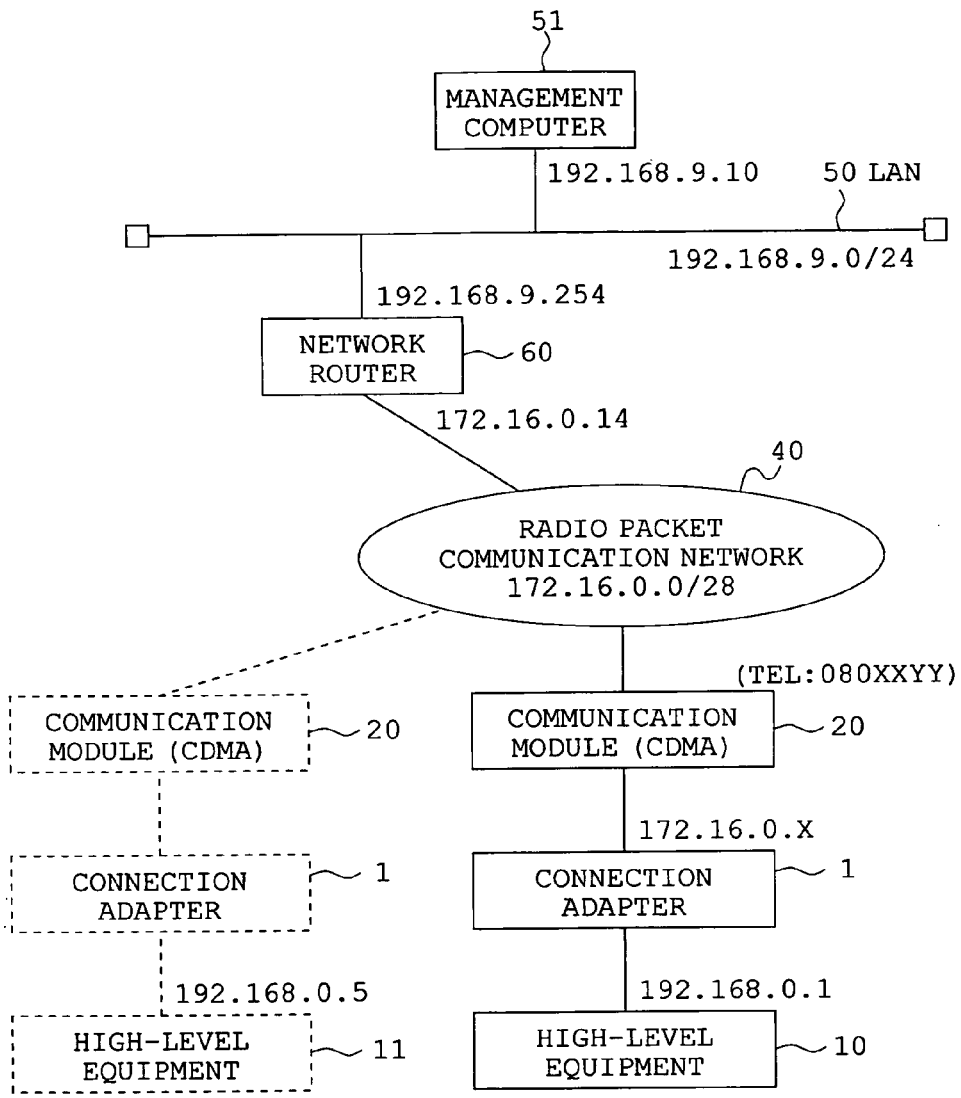
FIG. 18 is a view for explaining an example of the address conversion table in case of disguising high-level equipment.
FIG. 19 is a network view in case of disguising high-level equipment.

Here, as shown in FIG. 18, assume that the first high-level equipment 10 actually connected is set with the fixed IP address 192.168.0.1. Consequently, the sender IP address of the IP packet sent from the first high-level equipment 10 is 192.168.0.1. In such case, as shown in FIG. 19, a fixed IP address allotted to second high-level equipment 11 different from the first high-level equipment 10 is associated with the telephone number of the communication module 20 connected to the first high-level equipment 10 through a connection adapter, and they are kept stored in the high-level equipment information table 65*a*. As described above, the router 60 obtains the fixed terminal IP address with the telephone number notified from the connection adapter 1 as a key, and mutually converts the fixed terminal IP address and the dynamic terminal IP address therebetween. Consequently, as shown in FIG. 20, the sender IP address of the IP packet transmitted to the management computer 51 from the router 60 is stored not with the address allotted to the first high-level equipment 10, but with the address allotted to the second high-level equipment 11. In this manner, it is possible to disguise as if the communication is performed with the second high-level equipment 11 for the management computer 51. If such a disguise is possible, the address management of the network can be performed collectively in the router 60, and thus, it is preferable in terms of operation.

Second Embodiment

Figure 21:
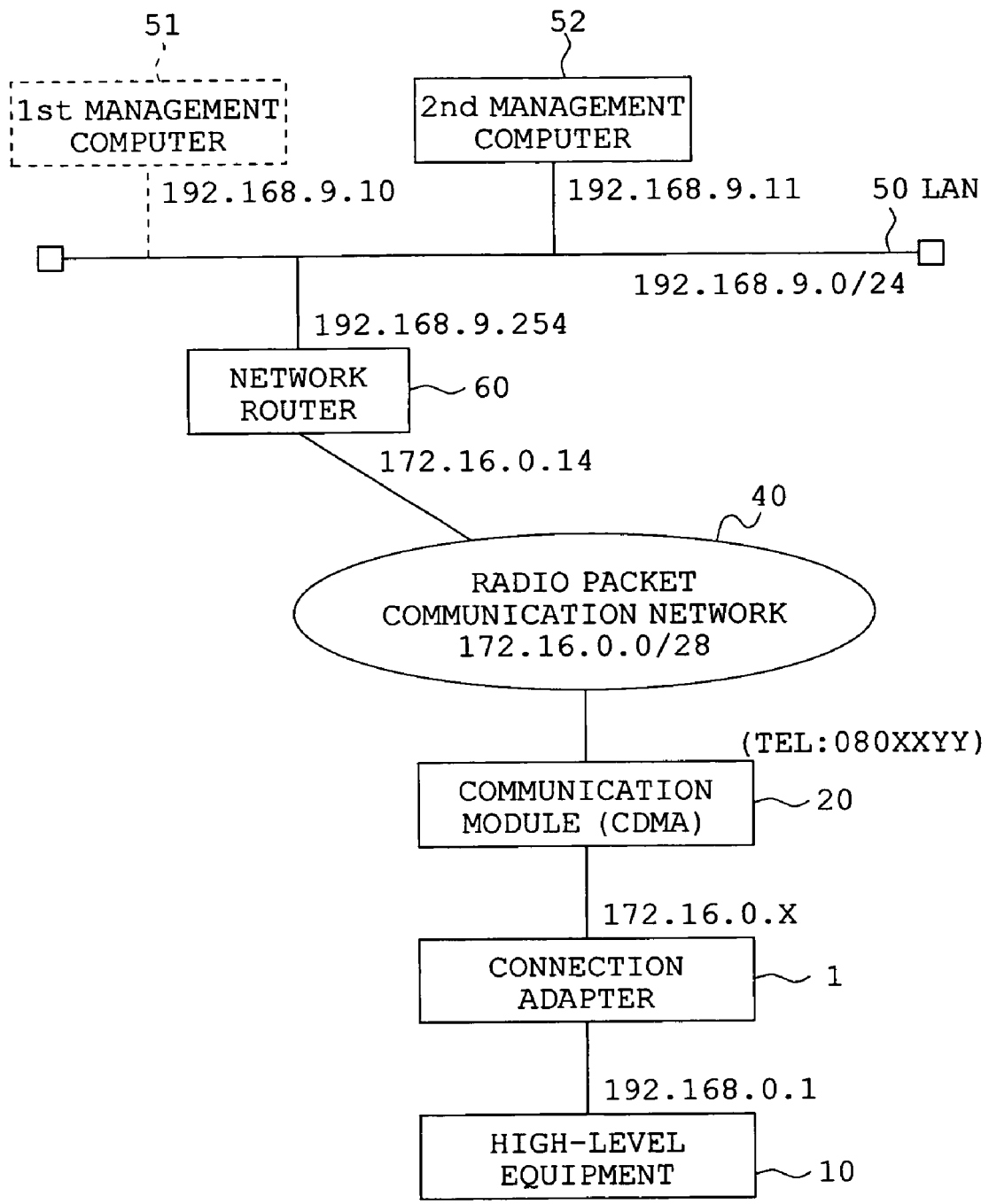
FIG. 21 is a network view of a communication system according to a second embodiment.

Next, a network router according to a second embodiment of the present invention will be described with referent to the drawings. FIG. 21 is a network diagram of telemetering system using the network router according to the present embodiment.

As shown in FIG. 21, a corporate LAN 50 is connected with a second management computer 52 of an IP address 192.168.9.11 in addition to a management computer 51 of an IP address 192.168.9.10 assumed as a communication destination by a high-level equipment 10. An object of the present embodiment is to make a communication possible with a communication destination of the high level-equipment 10 taken as a second management computer 52 without modifying and changing the high-level equipment 10. Other objects, configurations, and effects are the same as the first embodiment, and therefore, the description thereof will be omitted.

In order to realize such configuration, as shown in FIG. 22, a high-level equipment information table 65*a* is kept stored with the IP address of the management computer 51 which becomes an actual communication destination of each high level-equipment 10.

Upon receipt a communication ID, a telephone number, a fixed IP address (fixed terminal IP address) of the high-level equipment 10 from the connection adapter 1 connected to the high-level equipment 10, and an IP address of the communication destination (192.168.9.10 in the example of FIG. 21) by UDP packet, a connection control unit 63 of a router 60 obtains an IP address (192.168.9.11 in the example of FIG. 21) and a fixed IP address of an actual communication destination of the high-level equipment 10 from the high-level equipment information table 65*b* with the telephone number as a key. Then, the connection control unit 63 of the router 60 stores the communication ID, the fixed terminal IP address obtained from the high-level equipment information table 65a, the sender IP address of a packet storing the notice, a WAN side IP address of the router 60, and the IP address of the management computer 52 obtained from the high-level equipment information table 65a into an address conversion table 65b. By the above process, the address conversion table 65b is aligned with data necessary for an address conversion in the communication.

Figure 23:
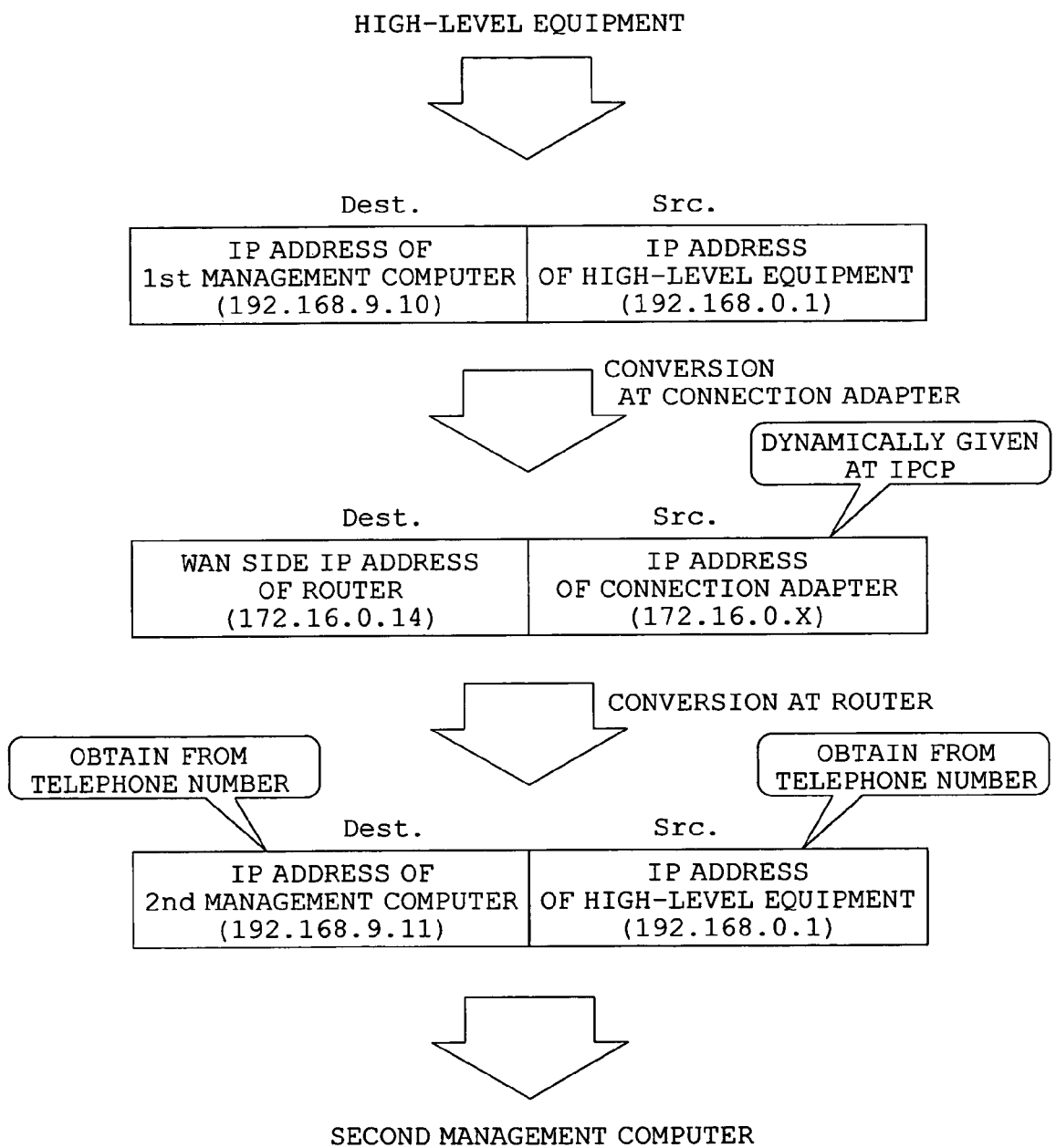
FIG. 23 is a view for explaining an address conversion processing.

Subsequently, in a communication control unit 64 of the router 60 and a communication control unit 122 of the connection adapter 1, the address conversion of a header of an IP packet according to the communication is performed. Specifically, as shown in FIG. 23, the terminal IP address and the dynamic terminal IP address are mutually converted therebetween, and the LAN side IP address of the router 60 and the IP address of the second management computer 52 are mutually converted therebetween. By the above described processing, a communication starting from the high-level equipment 10 to the second management computer 52 becomes possible.

As described above, according to the present embodiment, without changing and modifying the high-level-equipment 10, it is possible to divide the actual connection destination of the high-level equipment 10 into other destination. Further, it is possible also to freely change an IP address system of a corporate LAN 50 side. Other operation and effect are the same as those of the first embodiment. In the present embodiment also, similarly to the first embodiment, the disguise of the high-level equipment is possible.

Third Embodiment

A third embodiment of the present invention will be described with reference to the drawings. The difference of the communication system according to the present embodiment from the first embodiment mainly lies in the format of a network connection service in a radio packet communication network 40. The difference of this connection service from the first embodiment will be described below in detail.

Figure 24:
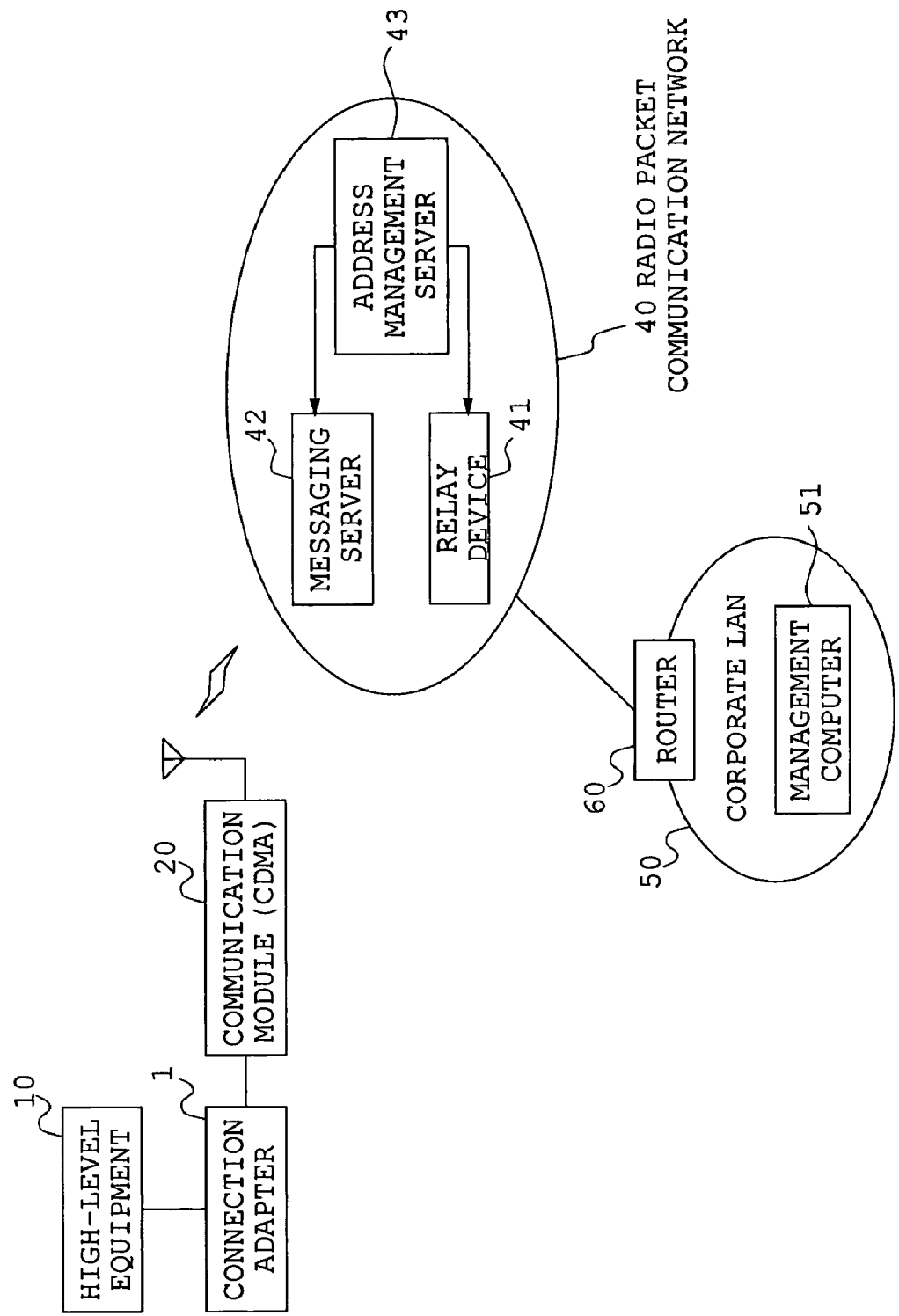
FIG. 24 is a block diagram of a communication system according to a third embodiment.

In this connection service, similarly to the first embodiment, an IP address is given to the connection terminal by a dynamic IP giving technique. However, different from the first embodiment, the IP address given to the connection terminal is predetermined in advance. As shown in FIG. 24, the radio packet communication network 40 is installed with an address management server 43. This address management server 43 manages a telephone number of the connection terminal and a list of IP address distributed to the terminal having the telephone number. Specifically, as shown in FIG. 25, the address management server 43 comprises a telephone number and an address correspondence table 43a described with a correspondence between the telephone number and the IP address. Further, this address management server 43 provides an interface to the user so that the address correspondence table 43 can be renewed.

In the present connection service, the radio packet communication network 40, when connected with the terminal, obtains the telephone number of the connection terminal. The radio packet communication network 40 obtains an IP address corresponding to the telephone number from the address correspondence table 43a, and distributes the obtained IP address to the connection terminal. This address distribution uses IPCP. That is, in the present embodiment, though a dynamic IP giving technique under the name of IPCP is used, the distribution IP address is predetermined.

Further, in the preset connection service, when the radio packet communication network 40 receives an IP packet addressed to the IP address corresponding to the terminal from a corporate LAN 50 while the terminal is not in a state of being connected to the radio packet communication network 40, a messaging server 42 obtains the telephone number corresponding to the IP packet from the address management server 43, and sends a message to this telephone number. This messaging service is not the network connection service using TCP/ICP, but is implemented by a unique protocol using a radio communication network. By this service, the terminal can recognize that a connection request has been received from the corporate LAN 50.

In the present embodiment, accompanied with use of the above described network connection service, a router 60 and the configuration and operation of a connection adapter 1 are different from the first embodiment. First, the router 60 will be described. Assume that the address system of the network in the present embodiment is the same as shown in FIG. 3.

In the first embodiment, the router 60 comprises a connection control unit 63 and a communication control unit 64. The connection control unit 63 performs an operation such as notifying a connection request from a corporate LAN 50 side by using a short message and the like. However, in the present embodiment, when a packet flows into the radio packet communication network 40 from the corporate LAN 50, the radio packet communication network 40 automatically transmits a message. Consequently, in the present embodiment, the connection control unit 63 is not required. Further, in the first embodiment, since the IP address of the connection terminal is not certain, the communication control unit 64 of the router 60 performs an address conversion processing. However, in the present embodiment, since the IP address of the connection terminal is defined by the address management server 43, naturally the communication control unit 64 does not require the address conversion processing. Consequently, it is sufficient that the communication control unit 64 of the router 60 has a common relay function to relay between the corporate LAN 50 and the radio packet communication network 40. That is, as described by referring to FIG. 2, it is possible to use a common router 60 in the assumed communication system described with reference to FIG. 2.

On the other hand, a connection control unit 121 of the connection adapter 1, similarly to the first embodiment, performs a circuit control such as establishment of a circuit connection and the like. Further, a communication control unit 122, similarly to the first embodiment, controls data communication on the circuit established by the connection control unit 121. However, the connection control unit 121 and the communication control unit 122 are different in operation from the first embodiment by corresponding to the network connection service. The operation of the connection adapter 1 will be described later.

Figure 26:
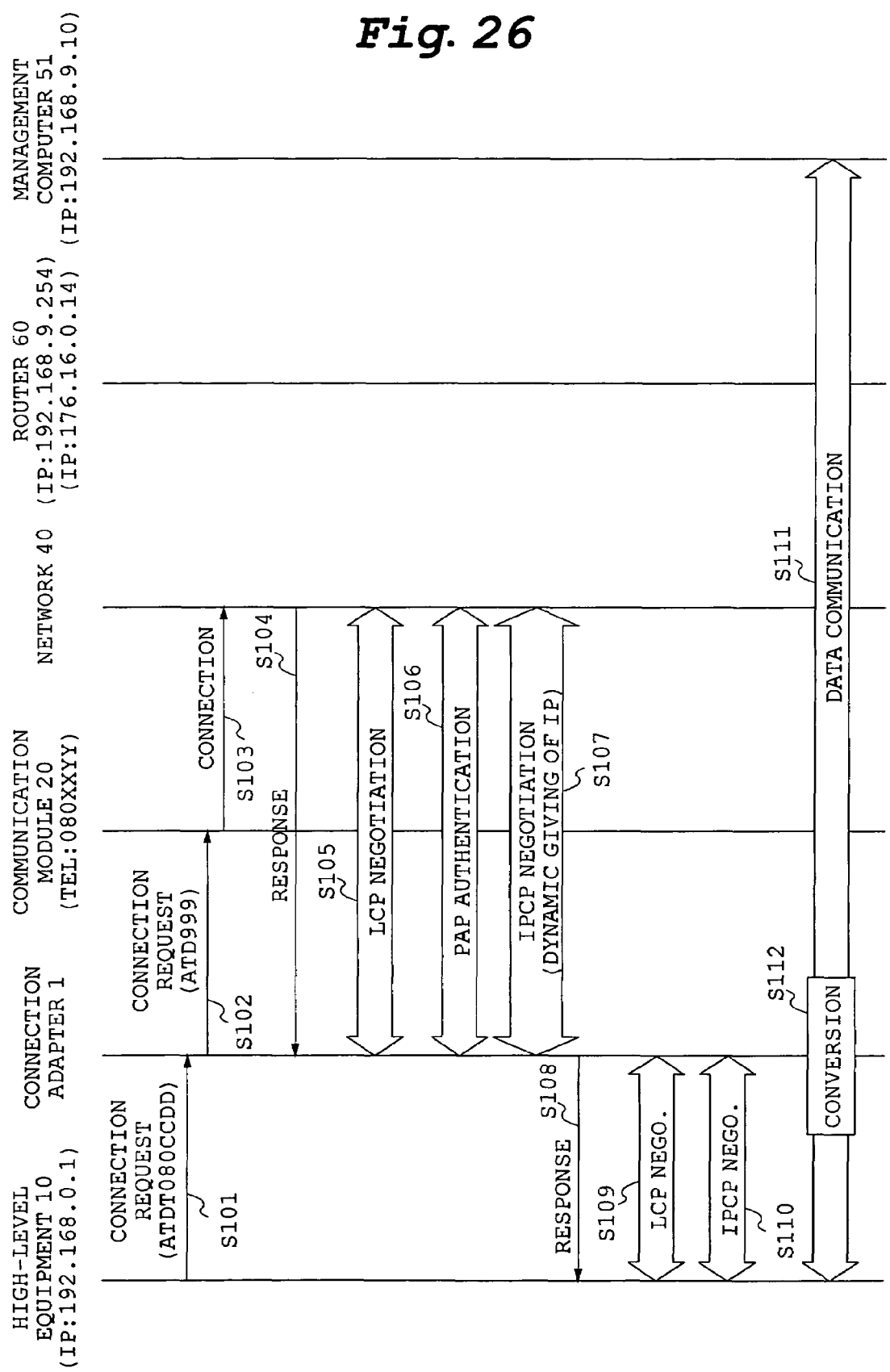
FIG. 26 is a view for explaining a sequence in case of starting a communication from the high-level equipment in the third embodiment.

Next, a communication procedure in the present system will be described with reference to the drawings. First, referring to FIGS. 26 and 27, a description will be made on a case of starting a communication from high-level equipment 10 to a management computer 51. FIG. 26 is a sequence chart in case of starting a communication from the high-level equipment to the management computer, and FIG. 27 is a view for explaining a conversion process of the IP address described in the header of the IP packet transmitted from the high-level equipment.

As shown in FIG. 26, when the high-level equipment 10 calls a [ATDT080CCDD] command for the connection adapter 1 (step S101), the connection control unit 121 of the connection adapter 1 converts the command into [ATD9999] and transfers it to a communication module 20 (step S102). As the momentum of this calling, a momentum such as shown in FIG. 27 when the IP packet of the destination address: 192.168.9.10 is generated can be cited. By this AT command, the communication module 20 calls a relay device 41 within the radio packet communication network 40 (step 103). The connection control unit 121 of the connection adapter 1, upon receipt of a response [CONNECT] to the effect that a connection has been completed at a circuit level through the communication module 20 (step S104), starts a processing to connect the connection adapter 1 to the corporate LAN 50 by PPP.

First, the connection control unit 121 of the connection adapter 1 starts LCP negotiation with the relay device 41 of the radio packet communication network 40 (step S105). Next, the connection control unit 121 of the connection adapter 1 performs PAP authentication processing with the relay device 41 of the radio packet communication network 40 (step S106). Although this PAP authentication processing is not assumed in the high-level equipment 10 prepared for the radio packet communication network 45, it is necessary when using the radio packet communication network 40. Hence, in the present embodiment, the connection adapter 1 performs the authentication processing on the behalf of the high-level equipment 10. When this authentication processing is completed, the connection control unit 121 of the connection adapter 1 starts IPCP negotiation between the connection adapter 1 and the relay device 41 of the radio packet communication network 40 (step S107). In this manner, IPCP negotiation is completed, and the connection control unit 121 of the connection adapter 1 is given a dynamic IP address: 172.16.0.X from the radio packet communication network 40. The IP address given here, as described above, is greatly different from the first embodiment in that it is predetermined in advance for the communication module 20 which is the connection terminal. The given dynamic IP address is stored in the storage unit such as the EPROM 151 and the like.

When PPP negotiation is completed, a response [CONNECT] to the effect that the connection has been completed at a circuit level is transmitted to the high-level equipment 10 (step S108). The high-level equipment 10, upon receipt of the response, starts LCP negotiation and IPCP negotiation (steps S109 and S110). Here, worth noting is that the connection control unit 121 of the connection adapter 1 responds to the high-level equipment 10. In this manner, it looks like the high-level equipment 10 refers to FIG. 10 and performs a connection processing with the packet communication network 45.

By the above described processing, the connection between the high-level equipment 10 and the corporate LAN 50 is completed, and hence, the high-level equipment 10 starts a data communication to the management computer 51 (step S111). Here, the communication control unit 122 of the connection adapter 1 performs an address conversion of the header of the IP packet (step S112). Specifically, as shown in FIG. 27, the fixed terminal IP address (192.168.0.1) and the dynamic terminal IP address (172.16.0.X) are mutually converted therebetween. By the above described processing, a communication starting from the high-level equipment 10 to the management computer 51 becomes possible.

Figure 28:
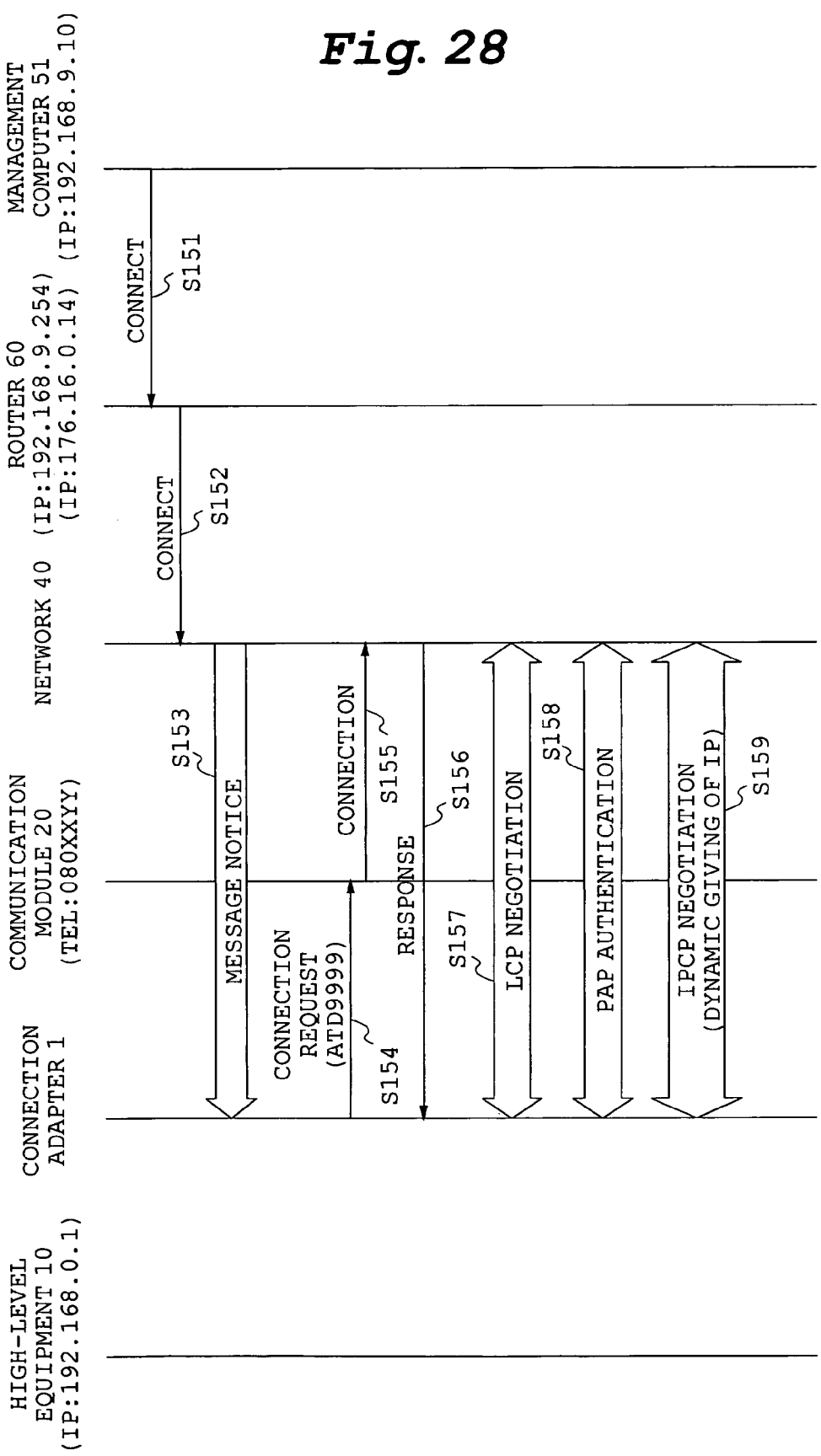
FIG. 28 is a view for explaining a sequence in case of starting a communication from the management computer in the third embodiment.
Figure 29:
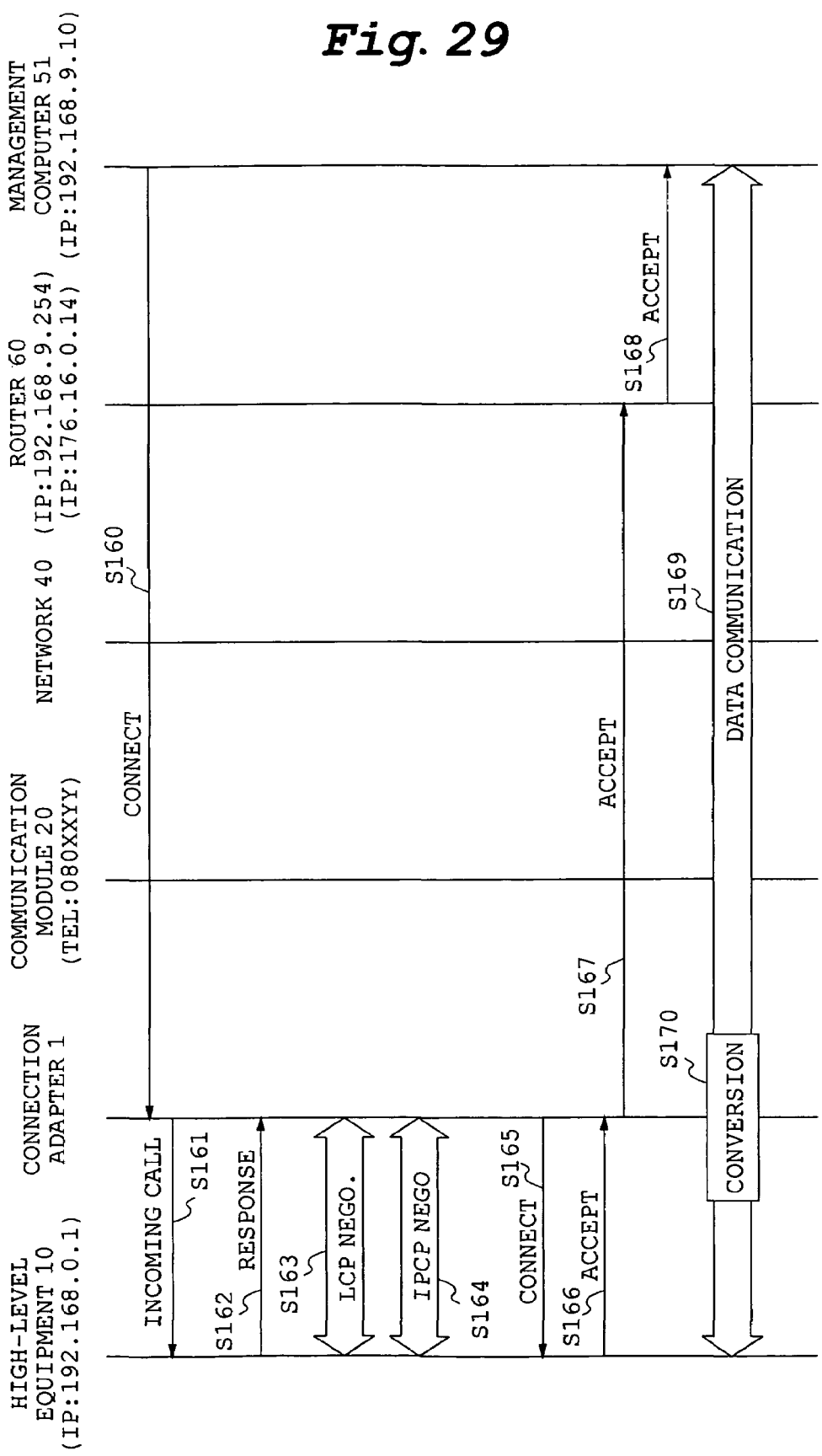
FIG. 29 is a view for explaining a sequence in case of starting a communication from the management computer in the third embodiment.
Figure 30:
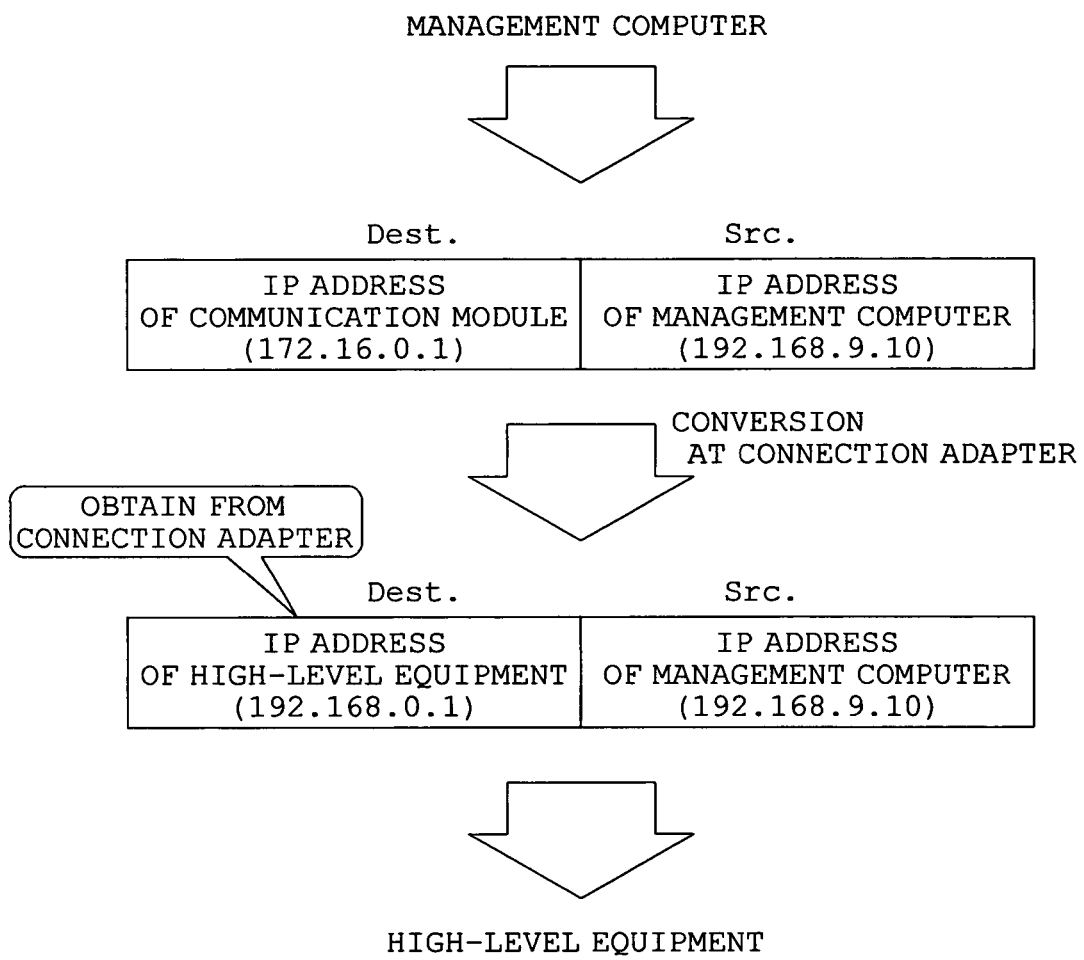
FIG. 30 is a view for explaining an address conversion processing.

Next, a description will be made on a case of starting a communication from the management computer 51 of the corporate LAN 50 to the high-level equipment 10 with reference to FIGS. 28 to 30. FIGS. 28 and 29 are sequence views of the communication started from the management computer, and FIG. 30 is a view for explaining a process of the address conversion.

Here, assume that the IP address [172.16.0.1] is allotted to the communication module 20 connected to the high-level equipment 10 in the address management server 43.

When the management computer 51 issues a connection request with the IP address [172.16.0.1] of the communication module 20 connected to the high-level equipment 10 as a destination in order to communicate with the high-level equipment 10 of the communication destination (step S151), the router 60 relays the packet into the radio packet communication network 40 according to the usual routing rule (step S152).

The radio packet communication network 40 refers to the destination IP address of the packet received from the router 60, and obtains a telephone number corresponding to the IP address from the address management server 43, and notifies the telephone number to the effect that the connection request was received from the corporate LAN 50 by using a messaging service (step S153). The radio packet communication network 40 discards the packet relating to the connection request received from the router 60.

The connection control unit 121 of the connection adapter 1 having received the message starts a connection processing to the first corporate LAN 50 based on the setting data stored in the setting data storage unit 151*a*. Specifically, the [ATD9999] command is sent to the communication module 20 (step S154). By this AT command, the communication module 20 calls the relay device 41 within the radio packet communication network 40 (step S155). The connection control unit 121 of the connection adapter 1, upon receipt of the response [CONNECT] to the effect that a connection has been completed at a circuit level through the communication module 20 (step S156), starts a processing to connect the connection adapter 1 to the corporate LAN 50 by PPP.

First, the connection control unit 121 of the connection adapter 1 starts LCP negotiation with the relay device 41 of the radio packet communication network 40 (step S157). Next, the connection control unit 121 of the connection adapter 1 starts PAP authentication processing with the relay device 41 of the radio packet communication network 40 (step S158). Next, the connection control unit 121 of the connection adapter 1 starts IPCP negotiation with the relay device 41 of the radio packet communication network 40 (step S159). In this manner, IPCP negotiation is completed, and the connection control unit 121 of the connection adapter 1 is given the dynamic IP address: 172.16.0.X from the radio packet communication network 40. The IP address given here, as described above, is greatly different from the first embodiment in that it is predetermined for the communication module 20 which is the connection terminal. The given IP address is stored in the storing means such as the EPROM 151 and the like.

When PPP negotiation is completed, a connection request packet arrives at the connection adapter 1 from the management computer 51 (step S160). As described above, the radio packet communication networks 40 discards the packet sent by the management computer 51 at the step S151. Hence, the management computer 51 is unable to receive the response of the connection request packet, and sends the connection request packet again due to time out. Further, since the processings of steps S153 to S159 require some time, a few of the packets sent again may further time out. Consequently, the connection request packet arriving at the connection adapter 1 is the latest one from among the packets sent again several times.

The connection control unit 121 of the connection adapter 1, upon receipt of the connection request packet from the management computer 51, notifies the high-level equipment 10 to the effect that an incoming call has been received (step S161). The high-level equipment 10, upon receipt of the incoming call notice, notifies the connection adapter 1 of a response to the incoming call notice (step S162), and starts LCP negotiation and IPCP negotiation (steps S163 and S164). Here, worth noting is that he connection control unit 121 of the connection adapter 1 responds to the high-level equipment 10. In this manner, it looks like the high-level equipment 10 refers to FIG. 11 and performs a connection processing with the packet communication network 45.

When PPP negotiation is completed, the connection control unit 121 of the connection adapter 1 transmits the connection request packet received from the management computer 51 at the step S160 to the high-level equipment 10 (step S165). The high-level equipment 10 having received the connection request packet sends the response to the connection adapter 1 (step S166). The connection adapter 1 relays the response packet to the router 60 (step S167). The router 60 relays this response packet to the management computer 51 according to the usual routing rule (step S168).

By the above described processing, the high-level equipment 10 determines that the connection to the management computer 51 has been completed, and starts data communication to the management computer 51 (step S169). Here, the communication control unit 122 of the connection adapter 1 performs an address conversion of the header of the IP packet (step S170). Specifically, as shown in FIG. 30, the fixed terminal IP address (192.168.0.1) and the dynamic terminal IP address (172.16.0.1) are mutually converted therebetween.

As described above in detail, in the communication system according to the present embodiment, as the router 60, a general one can be used, so that the system construction can be made at more moderate price and easily. Other advantages are the same as the first embodiment.

While the embodiments of the present invention have been described as above, the present invention is not limited thereto. For example, in the first and second embodiments, though the router 60 obtains the dynamic IP address given to the connection adapter 1 by referring to the sender IP address of the packet having stored the notice received from the connection adapter 1, this dynamic IP address may be included in the content of the notice.

Further, in each of the embodiments, while telemetering system performing the management of the automatic vending machine has been described, the present invention can be also applied to other telemetering systems or telematics systems.

Further, in each of the embodiments above, as a communication module, while ones having PDC standard, CDMA standard, and PHS standard have been illustrated as a communication module, a communication module of another standard can be also used to implement the present invention. Similarly, with respect to the interface standard of the high-level equipment side, the ones other than the above described can be applied.

Further, in each of the embodiments, while the authentication method, address system, and address giving method (giving fixed IP address or dynamic IP address) have been illustrated as a difference between the network connection service in the radio packet communication networks 45, 46 and the network connection service in the radio packet communication network 40, the present invention can be applied even when the difference is either one of these methods or combination thereof. Further, other differences can be also absorbed by the connection adapter as occasion demands. For example, in the above described embodiment, while PAP authentication has been performed in the radio packet communication network 40, in case a connection is made, for example, to the communication network performing CHAP (Challenge Handshake Authentication Protocol) authentication, the connection adapter may be implemented by CHAP.

Further, in each of the embodiments, while the connection adapter 1 has been built-in with three communication modules 20, 25, and 26, and each of the radio packet communication networks 40, 45, and 46 is allowed to be used arbitrarily, any one only of the communication modules 20, 25, and 26 may be built-in and connected.

We claim:

1. A communication system connecting a LAN and a radio communication terminal through a radio packet communication network by a network connection service dynamically giving an IP address within a first address space at the time the network is connected;
    wherein a network router is provided at a boundary point between the radio packet communication network and the LAN;
    wherein the radio communication terminal comprises a communication device connecting to the radio packet communication network, high-level equipment performing a communication by using the communication device, and a connection adapter interposed between the communication device and the high-level equipment and performing a relay of the communication;
    wherein the high-level equipment is allotted in advance with an IP address for a network connection service fixedly giving an IP address within a second address space as its own IP address, and moreover, an IP address within a third address space is fixedly set as an IP address of a terminal of a LAN side; and
    wherein the connection adapter comprises a communication control unit which mutually converts the IP address within the first address space stored in a header of an IP packet to be transmitted and received and the IP address within the second or third address space therebetween.

2. The communication system according to claim 1, wherein a communication control unit of said connection adapter mutually converts the IP address (dynamic terminal IP address) dynamically given to the connection adapter at the network connection time and the IP address (fixed terminal IP address) allotted in advance to the high-level equipment therebetween.

3. The communication system according to claim 1, wherein said network router comprises control unit mutually converting the IP address within the first address space stored in the header of the IP packet to be transmitted and received and the IP address within the second or third address space therebetween.

4. The communication system according to claim 3, wherein the communication control unit of said connection adapter and the communication control unit of the network router mutually convert the IP address (dynamic terminal IP address) dynamically given to the connection adapter at the network connection time and the IP address (fixed terminal IP address) allotted in advance to the high-level equipment therebetween, and mutually convert the IP address allotted to the radio packet communication network side of the network router and the IP address of the terminal of the LAN side therebetween.

5. The communication system according to claim 4, wherein
    said connection adapter comprises connection control means for establishing a connection with the radio packet communication network upon receipt of a communication start request to the terminal of the LAN side from the high-level equipment, and notifying a telephone number of the communication device at least to the network router;

said network router, comprising: a first storage means for storing in advance a set of pairs of (a) the telephone number of a communication device and (b) the fixed terminal IP address of the high-level equipment using said communication device;

and the connection control unit for obtaining the fixed terminal IP address of the high-level equipment from the first storage means based on the telephone number included in a notice received from the connection adapter and obtaining the IP address dynamically given to the connection adapter and obtaining the IP address dynamically given to the connection adapter from the header of a packet storing the notice.

6. The communication system according to claim 4, wherein said network router comprises:

a first storage means for storing in advance a set of pairs of (a) the telephone number of a communication device and (b) the fixed terminal IP address of the high-level equipment using said communication device; and connection control means for obtaining the telephone number to the fixed terminal IP address from said first storage means when a communication start request addressed to the fixed terminal IP address is received from the terminal of the LAN side, generating management information identifying the communication, associating said fixed terminal IP address and the management information so as to be stored in the first storage means, and notifying said management information to the communication device having the telephone number obtained from said storage means by using a messaging service provided in the radio packet communication network;

wherein said connection adapter comprises connection control means for establishing a connection with the radio packet communication network when said notice is received from the network router and storing said management information included in the notice in a predetermined second storage means, and responding said management information to the network router by using the established network connection service;

wherein the connection control means of said network router, upon receipt of the management information from the connection adapter, obtains the dynamic terminal IP address of the radio communication terminal from the IP packet storing the management information, and stores the dynamic terminal IP address by associating it with the management information stored in said first storage means;

wherein the communication control unit of the network router performs said conversion processing based on each IP address stored in said first storage means; and wherein the communication control unit of the connection adapter performs said conversion processing based on each IP address stored in said second storage means.

7. The communication system according to claim 4, wherein, when the IP packet having the IP address within the first address space flows into the radio packet communication network from the terminal of the LAN side through the network router in said radio packet communication network, a messaging service for transmitting a message to the radio communication terminal having the telephone number corresponding to the IP address is provided;

wherein said connection adapter comprises the connection control means for establishing a connection with the radio packet communication network when a message is received from the radio packet communication network.

8. A network router installed at a boundary point between a LAN and a radio packet communication network, wherein a network connection service connecting the LAN and a radio terminal and dynamically giving an IP address within a first address space to the radio communication terminal is provided in said radio packet communication network;

said network router comprising:

storage means for storing in advance a set of pairs of (a) the telephone number of a radio communication terminal and (b) an IP address (fixed terminal IP address) within a second address space allotted to said radio communication terminal;

connection control means for establishing a connection between the terminal of a LAN side and the radio communication terminal; and address converting means for converting an IP address stored in the header of an IP packet between the terminal of the LAN side and the radio communication terminals;

wherein said connection control means, upon receipt of a communication start request addressed to the fixed terminal IP address from the terminal of the LAN side, obtains the telephone number corresponding to the fixed terminal IP address from said storage means, generates management information to identify the communication, associates said fixed terminal IP address with the management information so as to be stored in the storage means, notifies said management information to the telephone number obtained from said storage means by using a messaging service provided in the radio packet communication network;

and upon receipt of the management information transmitted by the radio communication terminal according to said notice by using the network connection service, obtains the IP address (dynamic terminal IP address) dynamically given to the radio communication terminal from an IP packet storing the management information, and stored the dynamic terminal IP address by associating it with the management information stored in said storing means; and wherein said address converting means, based on each address information stored in said storage means, mutually converts the IP address of the LAN side terminal stored in a header of the IP packet relating to said communication and the IP address of the radio packet communication network side of the network router therebetween, and mutually converts the fixed terminal IP address and the dynamic terminal IP address therebetween.

9. The network router according to claim 8, wherein said connection control means, upon receipt of a communication staff request from the radio communication terminal by using the network connection service, obtains the fixed terminal IP address of the radio communication terminal corresponding to the telephone number included in the communication start request from said storage means, obtains the dynamic terminal IP address dynamically given to the radio communication terminal from the communication start request, stores the IP address of the LAN side terminal which becomes a destination of the fixed terminal IP address and the communication and the dynamic terminal IP address into the storage means; and wherein said address converting means, based on each address information stored in said storage means, mutually converts the IP address of the LAN side terminal stored in the header of the IP packet relating to said communication and the IP address of the radio packet communication network side of the network router therebetween, and mutually converts the fixed terminal IP address and the dynamic terminal IP address therebetween.

10. The network router according to claim 9, wherein said storage means stores in advance the set of the pairs of (a) the telephone number of the radio communication terminal and (b) the IP address of the connection destination terminal of the radio communication terminal in the LAN side;

wherein said connection control means obtains the IP address of the LAN side terminal corresponding to the telephone number notified from the radio communication terminal from said storage means;

wherein said address converting means, based on each address information stored in said storage means, mutually converts the IP address of the LAN side terminal stored in a header of the IP packet relating to said communication and the IP address of the radio packet communication network side of the network router therebetween, and mutually converts the fixed terminal IP address and the dynamic terminal IP address therebetween.

11. The network router according to claim 8, comprising history storage means for storing an operation history of said connection control means and address converting means.

12. A method of connecting a LAN and a radio communication terminal through a radio packet communication network and establishing a connection between a LAN side terminal and the radio communication terminal, wherein a radio communication terminal from the terminal of said LAN side is under the provision of a network connection service dynamically giving up an IP address within a first address space for the radio communication terminal;

wherein a network router installed at a boundary point between said LAN and the radio packet communication network comprises storage means for storing in advance a set of pairs of (a) a telephone number of the radio communication terminal and (b) an IP address (fixed terminal IP address) within a second address space allotted to said radio communication terminal, and comprising the steps of:

(a) obtaining the telephone number corresponding to the fixed terminal IP address by a connection control means of the network router from said storage means when a communication start request addressed to the fixed terminal IP address from the LAN side terminal is issued to the network router, generating management information identifying the communication, associating said fixed terminal IP address with the management information so as to be stored in the storage means, notifying the telephone number obtained from said storage means by using a messaging service provided in the radio packet communication network to said management information;

(b) responding to the management information included in the notice to the network router by using the network connection service by the radio communication terminal having received the notice from the network router;

(c) obtaining the IP address (dynamic terminal IP address) dynamically given to the radio communication terminal from an IP packet header storing the management information when the connection control means of the network router receives the management information from the radio communication terminal, and associating the dynamic terminal IP address with the management information stored in said storage means so as to be stored; and (d) a communication control means of the network router subsequently, mutually converting the IP address of the LAN side terminal stored in the header of the IP packet relating to said communication and the IP address of the radio packet communication network side of the network router therebetween based on each address information stored in said storage means, and mutually converting the fixed terminal IP address and the dynamic terminal IP address therebetween.

\* \* \* \* \*